(12) United States Patent
Mizner

(10) Patent No.: US 9,090,441 B2
(45) Date of Patent: Jul. 28, 2015

(54) TRUCK FORK ATTACHMENT INCLUDING ADJUSTABLE MAST FOR GROUND CLEARANCE

(76) Inventor: Richard J. Mizner, Surprise, AZ (US)

(*) Notice: Subject to any disclaimer, the term of this patent is extended or adjusted under 35 U.S.C. 154(b) by 2804 days.

(21) Appl. No.: 11/440,865

(22) Filed: May 24, 2006

(65) Prior Publication Data
US 2007/0059135 A1    Mar. 15, 2007

Related U.S. Application Data

(63) Continuation-in-part of application No. 10/958,520, filed on Oct. 4, 2004, now Pat. No. 8,322,968.

(60) Provisional application No. 60/553,610, filed on Mar. 15, 2004.

(51) Int. Cl.
*B66F 9/08* (2006.01)
*B60P 1/44* (2006.01)
*E02F 3/96* (2006.01)

(52) U.S. Cl.
CPC ............... *B66F 9/082* (2013.01); *B60P 1/4442* (2013.01); *E02F 3/96* (2013.01)

(58) Field of Classification Search
USPC .......... 414/482, 484, 630; 224/403, 500, 504, 224/511, 547, 555; 248/274.1
See application file for complete search history.

(56) References Cited

U.S. PATENT DOCUMENTS

| | | | |
|---|---|---|---|
| 3,357,580 A * | 12/1967 | Schettler et al. ............... | 414/482 |
| 3,412,882 A | 11/1968 | Stockwell | |
| 3,669,292 A | 6/1972 | Tuura | |
| 3,896,956 A | 7/1975 | Hostetler | |
| 4,023,690 A | 5/1977 | Goode | |
| 4,061,257 A * | 12/1977 | St. Clair ........................ | 224/508 |
| 4,177,001 A * | 12/1979 | Blackwood ................... | 414/628 |
| 4,206,829 A | 6/1980 | Melocik | |
| 4,258,961 A * | 3/1981 | Ackeret ........................ | 312/111 |
| 4,325,666 A | 4/1982 | Chain et al. | |
| 4,365,921 A * | 12/1982 | Brouwer et al. .............. | 414/347 |
| 4,388,037 A * | 6/1983 | Suarez .......................... | 414/607 |
| 4,415,302 A | 11/1983 | Brouwer et al. | |
| 4,778,327 A | 10/1988 | Tufenkian et al. | |
| 5,208,753 A | 5/1993 | Acuff | |
| 5,409,346 A | 4/1995 | Grether | |
| 5,542,803 A | 8/1996 | Driggs | |
| 5,653,569 A | 8/1997 | Sears | |
| 5,816,764 A | 10/1998 | Bohata | |
| 5,836,493 A * | 11/1998 | Grunsted et al. ............. | 224/519 |
| 5,951,236 A * | 9/1999 | Thompson ................... | 414/607 |

(Continued)

FOREIGN PATENT DOCUMENTS

FR    2615157 A1    11/1988

*Primary Examiner* — James Keenan
(74) *Attorney, Agent, or Firm* — Greg L. Martinez

(57) ABSTRACT

A fork lift for a truck may have at least one mounting beam for pivotally supporting a fork lift mast on a truck frame. The fork lift may extend well below a level of the truck bed to enable engagement of palletized loads resting on the ground by the forks of the fork lift. The mast and fork of the fork lift may be adjusted by removably attaching a pivot connection of the mounting beam to the mast at a selected position along the mast. Attachment elements on the mast may be formed by one or more attachment structures or points. The pivot connection may be attached directly to the mast or may be attached via an attachment bracket having a bracket attachment mechanism that may include one or more attachment elements similar to those on the mast for mutual attachment at a desired height.

18 Claims, 11 Drawing Sheets

(56) References Cited

U.S. PATENT DOCUMENTS

| | | |
|---|---|---|
| 6,019,567 A | 2/2000 | Lutkus et al. |
| 6,033,177 A | 3/2000 | Kooima |
| 6,116,843 A | 9/2000 | Braud |
| 6,234,741 B1 | 5/2001 | McDaniel |
| 6,612,615 B1 * | 9/2003 | Dimand .................. 280/769 |
| 6,655,897 B1 | 12/2003 | Harwell |
| 6,957,847 B2 | 10/2005 | Rigel |
| 7,318,541 B2 * | 1/2008 | Fraer et al. .................. 224/518 |
| 2001/0022616 A1 | 9/2001 | Rademacher et al. |
| 2006/0231581 A1 * | 10/2006 | Jones .................. 224/403 |
| 2006/0263182 A1 * | 11/2006 | Mizner .................. 414/462 |
| 2007/0166138 A1 * | 7/2007 | Brooks .................. 414/471 |

* cited by examiner

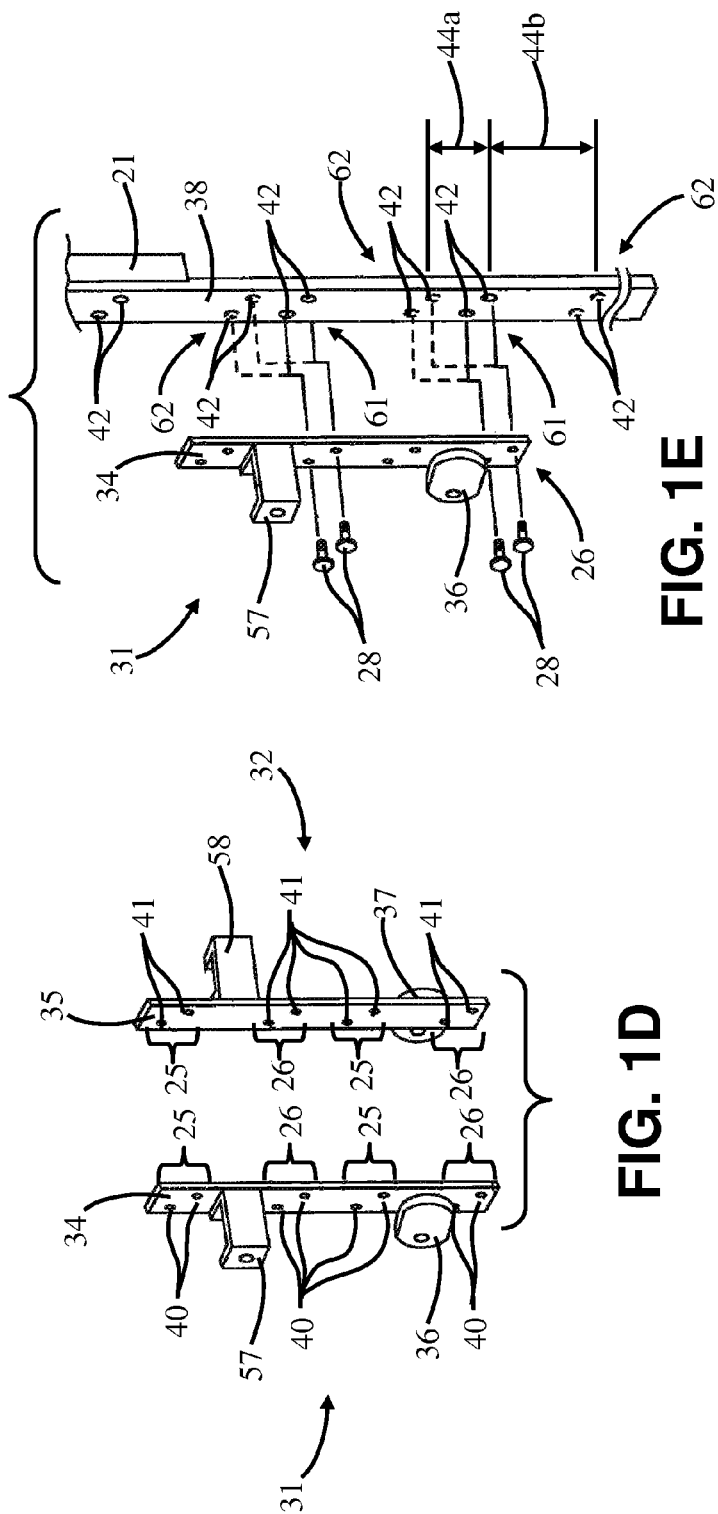
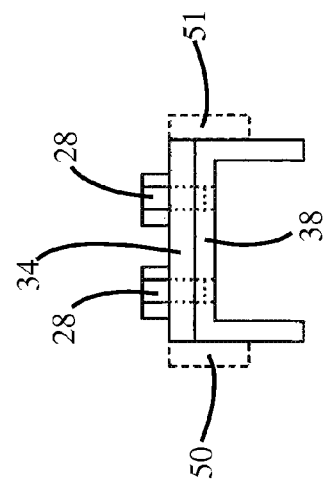
FIG. 1D
FIG. 1E
FIG. 1F

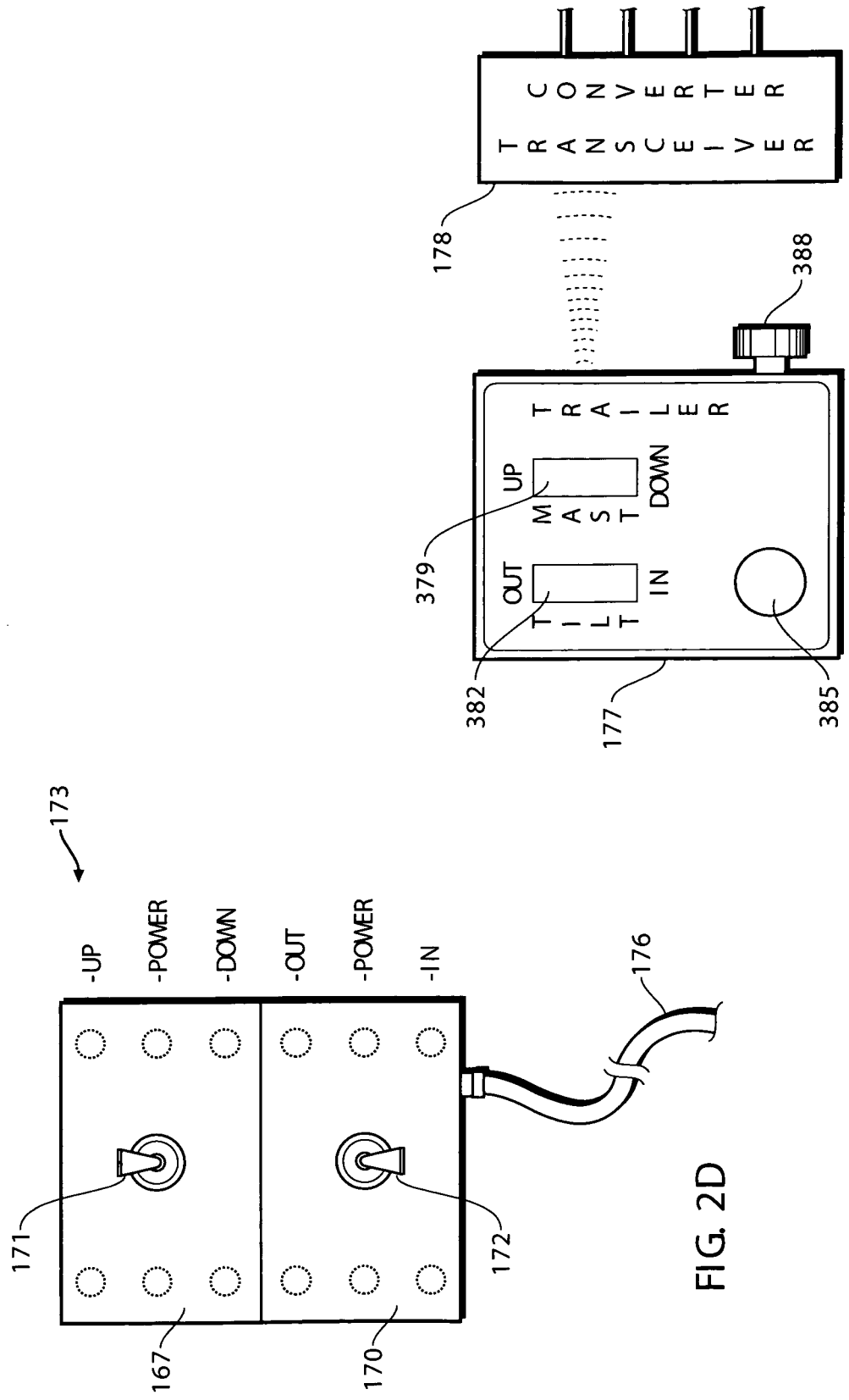

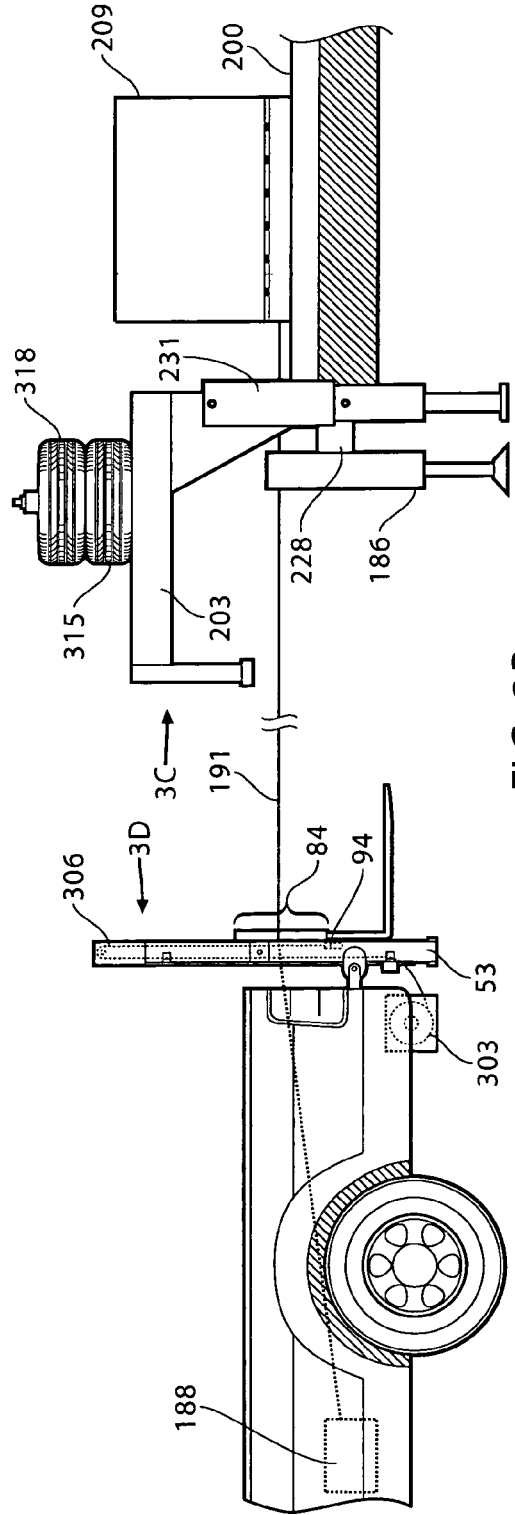
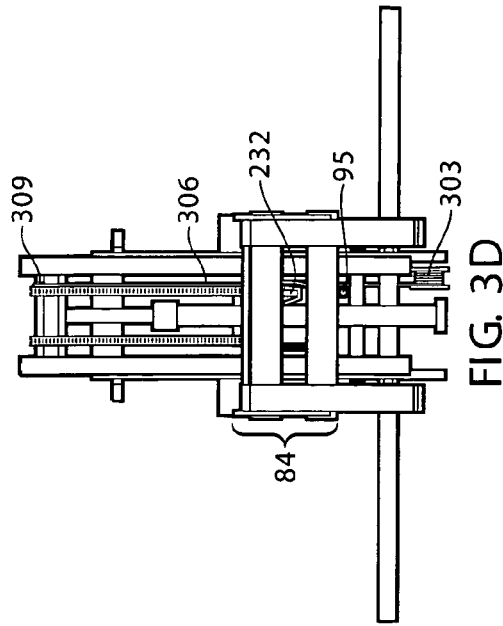
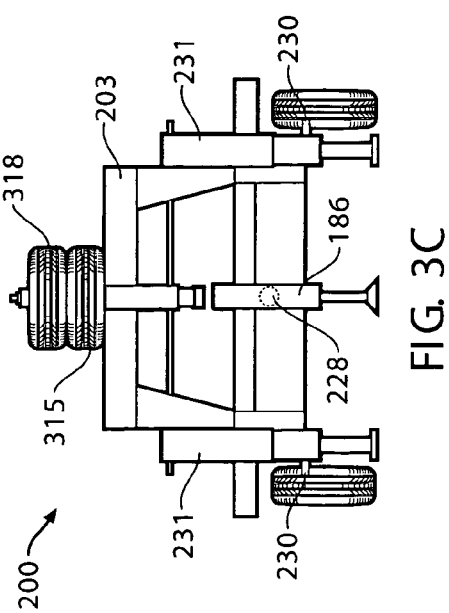
FIG. 3B
FIG. 3C
FIG. 3D and entitled "FORK LIFT FOR TRUCKS, METHODS, AND ASSOCIATED DEVICES", which in turn claims the priority benefit of U.S. Provisional Patent Application Ser. No. 60/553,610, filed Mar. 15, 2004, and entitled "TRUCK FORK LIFT, METHODS, AND ASSOCIATED DEVICES", the disclosures of which are each incorporated herein by reference.

TRUCK FORK ATTACHMENT INCLUDING ADJUSTABLE MAST FOR GROUND CLEARANCE

The present application is a continuation-in-part of U.S. patent application Ser. No. 10/958,520, filed Oct. 4, 2004 now U.S. Pat. No. 8,322,868 by Richard Mizner, and entitled "FORK LIFT FOR TRUCKS, METHODS, AND ASSOCIATED DEVICES", which in turn claims the priority benefit of U.S. Provisional Patent Application Ser. No. 60/553,610, filed Mar. 15, 2004, and entitled "TRUCK FORK LIFT, METHODS, AND ASSOCIATED DEVICES", the disclosures of which are each incorporated herein by reference.

BACKGROUND OF THE INVENTION

1. Technical Field

This invention generally relates to lifts, booms, and other devices for lifting and hauling loads, and more particularly to a fork lift attachment for a truck and related devices and methods of lifting and hauling loads.

2. State of the Art

In the past, lifts on trucks have included booms, cranes, or tailgate lifts. These booms are generally tall and are not well adapted for placing pallets in residential garages. They often require more than one person in order to be operated safely. Furthermore, these lifts are manufactured with a limited capacity, typically less than or equal to 3,000 pounds. The tendency is to overload the boom and risk failure, damage to property, and possible injury to the operator or others. Users of such lifts are typically not experienced in loading, transporting, and unloading heavily laden pallets. However, with the advent of Home Depot (TM of Homer TLC, Inc.) and other do-it-yourself home product and project stores, the temptation for users to try to handle loads with such lifts is very real. In operating such a lift, maintaining control of the swinging load can be especially dangerous. Hence, devices and a method for home delivery of loads in a range from approximately 200 pounds up to approximately 4000 pounds are needed. It should be noted that currently the state of Arizona, (and perhaps other states), require a CDL license for loads of 26,001 pounds or greater. Additional fees are also required for carrying such loads.

In other applications, such as in roofing of new buildings having high roofs and/or uneven or soft terrain, a telescoping all-terrain fork lift is used. These all-terrain fork lifts are expensive and costly to maintain. Changing the brakes on any fork lift will typically cost around $2,000. Furthermore, non-all terrain fork lifts do not have the capability of going in rough or soft terrain.

DISCLOSURE OF THE INVENTION

The present invention relates to truck fork lifts and other related devices for lifting and hauling medium sized loads. Because of the deficiencies of past devices and methods, there is an incentive to provide a set of devices and methods that enable transport and delivery of loads in a medium range of weights. As explained above, there is a demand for a delivery method for safely and reliably lifting and hauling medium sized loads and the devices that enable such a method. The Inventor has found a market niche for using such devices and for providing delivery of these medium sized loads.

Accordingly, the present invention includes a fork lift that may be mounted on the back of a truck. In an exemplary embodiment, the fork lift has a fork bearing mast that is pivotally mounted to mounting beams that extend in fore and aft directions in the bed of a pickup truck. Alternatively, the fork lift may be applied to a cabover truck. It is to be understood that the fork lift may be mounted on a truck having a bed or may be mounted on a truck having an otherwise bare frame. The mast may be moved from an upright use position to a flat non-use position by actuating hydraulic ram(s) that pivotally pull the mast down into the bed of the truck. These hydraulic ram(s) may also be used to tilt the mast for proper angular orientation of the forks during use. The mounting beams may be four to eight feet long and may be welded or otherwise fixed to flat stock material lying flat in the bed of the truck. In an alternative range, the mounting beams may be from seven to eight feet long. The flat stock may be bolted to a truck frame cross member of the truck chassis by ⅝ inch bolts extending through the bed of the truck and the flat stock to the mounting beam, for example. It is to be understood that the bolts may be of any size, and may be limited only by the desired strength in holding the beams and fork lift in the truck.

The fork lift may have a mast of 6 feet or less so that when backing in and out of residential garages or other low clearance loading and unloading areas, the total (unloaded) height may reach no more than seventy-nine inches. In this configuration, the fork lift may have only one telescoping inner piece or an inner carriage that moves up and down within an outer piece in a non-telescoping manner. Alternatively, the present invention could incorporate a six to eight foot lift that could reach a height of 20-25 feet in its extended configuration by way of additional telescoping inner pieces. Such a height capability would be advantageous for roofing applications where the terrain may be uneven. For example, the invention with a 20-25 feet height capacity could be used for lifting loads of ceramic tile to a roof. It is to be understood, that a three or four section telescoping mast may have the advantage of being more rigid than a single or double sectioned mast.

In another aspect, it is apparent that a truck fork lift of the present invention is less costly to both provide and maintain, while being capable of use in applications having rough or soft terrain. That is, a truck fork lift that may be provided as an attachment to a truck in accordance with the present invention will be less costly while providing advantages not enjoyed by conventional fork lifts.

In order to guide the truck fork lift of the present invention, two or more cameras may be installed with a corresponding two or more channel monitor in the cab of the truck. These cameras may be DC Mobil rated. One of the cameras may be placed on the mast or bumper of the truck, and may be directed to view an area immediately behind the truck. The other camera may be positioned on the forks or fork plate to view the openings in a pallet during stabbing of the forks into the pallet. The fork lift may further include a viewing mechanism having at least one camera supported on and movable with the fork plate. The fork lift may also include, or have associated therewith, a monitor in a cab of the truck. A video cable may operatively connect the camera to the monitor. In configurations having one or more cameras supported on a moving portion of the mast, fork plate, or forks, the video cable may be advantageously supported at least in part by a spring loaded cable reel that pays out cable when the cable is under tension from a camera end thereof. The cable reel may also automatically retract a portion of the cable in order to take up slack in the cable when the fork plate and the camera move and change the required effective length of the cable. Alternatively, the cameras may be supported on the truck or an outer piece of the mast so as not to require the spring loaded cable reel.

The fork lift may include manual hydraulic actuators, which enable actuation at a speed proportional to the distance the actuators are moved. However, this would require extensive modification within the cab for operator comfort and ease. Therefore, the present invention typically has on/off electric over hydraulic solenoid valves, which do not enable variable speed operation. With this electric over hydraulic actuator configuration, the flow in the hydraulic system may be restricted to ensure that the lift moves at a slower speed. Furthermore, the common practice of bumping the fork lift on and off is still available for fine adjustments in height. Still further, an electric over hydraulic control that is capable of adjusting the speed to be proportional to a distance the actuator is moved is also possible with the present invention.

In any case, the electric over hydraulic control enables remote operation of the fork lift so that a user may operate the lift from the cab or from outside the truck. This is particularly advantageous because of the need to see and adjust the height of the fork in uneven terrain. Furthermore, remote actuation enables accurate stabbing of the fork because the user can get any vantage point he or she wishes. On the other hand, the pendent for the control may be kept relatively short to keep a user away from a load being lifted for safety reasons.

The truck fork lift of the present invention may be placed on a one ton truck having dual wheels and a manufacturer's specification or be modified to a weight capacity in a range from 3,400 to 4,400 pounds. It is to be understood that the fork lift of the present invention may be mounted on any truck including those of lower weight capacity rear suspensions. A two stage minimum 4,000 pound capacity fork lift with at least 36 inch forks may be incorporated.

In one aspect, the present invention may include an adjustment bracket for adjustably supporting a fork lift mast on at least one mounting beam fixed to a vehicle. The adjustment bracket may include at least one adjustment bracket base. The base may have an attachment mechanism including a plurality of attachment points. The attachment points may be discrete attachment points, such as would be provided by a plurality of bolt holes. Alternatively, the plurality of attachment points may be provided by an extent of the base along which a weldment will be applied to attach the base to the outer piece of the mast, for example. The adjustment bracket may also include a pivot connection piece or otherwise define a pivot point for the mast. The pivot connection piece may be supported on the base.

Alternatively, the present invention may include an adjustment mechanism that more generally provides adjustable pivot points. The pivot points may be provided by adjustable pivot plates that are independent of and adjustably supported on the bracket described above. Furthermore, the adjustable pivot plates may be adjustably supported directly on the outer piece of the mast. On the other hand, a plurality of pivot points may be located along a length of the bracket or even the outer piece of the mast itself. These pivot points may be provided by through holes for receiving pivot pins, for example.

In the configuration having a bracket or pivot plate adjustably supported on the outer piece of the mast, the base of the adjustment bracket may be an elongate base. The plurality of discrete attachment points may form an elongate pattern extending along at least a portion of the elongate base. The elongate pattern may include a repeating pattern of the discrete points. The attachment points may include mounting holes. The mounting holes may include a plurality of different sized bolt holes for selectively receiving a set of bolts corresponding to a predetermined particular height. The base may have at least one flange extending transverse to a plane of the base for engaging edges of the outer piece of a fork lift mast.

A pair of adjustment brackets may including the details of the adjustment bracket described above. The pair of adjustment brackets may thus have respective bases having respective adjustment mechanisms and respective pivot connection pieces supported on the respective bases. The pivot connection pieces define respective pivot points so that when the bases are attached to the mast, the respective pivot connection pieces and pivot points are supported at specific respective locations on the mast.

In another aspect, the present invention may include an adjustable height fork lift mast for adjustable mounting of a truck fork lift mast on a mounting beam supported on a truck. The adjustable height fork lift mast may include at least one outer piece and at least one inner piece telescopically supported on the at least one outer piece. The adjustable height fork lift mast may also include an attachment mechanism including a plurality of discrete attachment points on the at least one outer piece. The plurality of discrete attachment points may be disposed at least partially along a length of the outer piece.

An attachment element may be made up of a subset of the plurality of discrete attachment points. For example, the attachment element may include a particular set or pattern of mounting holes. The plurality of discrete attachment points may include a plurality of distinct patterns of mounting holes, which may provide a respective plurality of distinct attachment elements. The plurality of distinct patterns of mounting holes may include mounting holes of a first of the patterns having different dimensions from mounting holes of a second of the patterns. Thus, mounting bolts of a particular size may be associated with a particular mounting element (or pattern of holes) and an associated height adjustment. This may better assure proper mounting and adjustment of the forklift on a particular truck configuration.

The adjustable height fork lift mast may include a pair of outer pieces including the details of the outer piece described above. The adjustable height fork lift mast may include a pair of inner pieces including the details of the inner piece described above. The attachment mechanism may include a matching pattern of discrete attachment points on each of the outer pieces. That is, the pattern of discrete attachment points on each of the outer pieces may match each other.

In another aspect, the present invention may include a fork lift for height adjustable mounting on a truck. The fork lift may include a pair of adjustment brackets adjustably connecting pivot connections of respective mounting beams to respective outer pieces of a fork lift mast. The adjustment brackets may have a bracket attachment mechanism. The mounting beams may be adapted to be supported in a truck. The fork lift may include a mast adjustment mechanism on outer pieces of the mast. One of the adjustment mechanisms may have at least one attachment element and the other of the adjustment mechanisms may have a plurality of attachment elements. The at least one attachment element of the one adjustment mechanism may be removably attached to one of the plurality of attachment elements of the other of the adjustment mechanisms for selective height adjustment of the mast.

In this regard, it is to be understood that the attachment elements may include a plurality of discrete attachment points. The attachment mechanism may include at least one set of fasteners connecting respective ones of the attachment points of the adjustment bracket to respective ones of the attachment points of the outer pieces of the mast.

A first of the plurality of the attachment elements may be centered at a position spaced from a center of a second of the plurality of the attachment elements. Thus, selective attachment of the at least one attachment element to one of the first and second attachment elements may determine a height position of the mast relative to the mounting beams.

The attachment brackets may each include a plurality of patterns of attachment points. The outer pieces of the mast may each include at least one pattern of attachment points that matches at least one of the patterns of the attachment points on the attachment brackets. The plurality of patterns may be spaced along a length of the adjustment bracket.

Alternatively, the attachment brackets may each include at least one pattern of attachment points. The outer pieces of the mast may each include a plurality of patterns of attachment points that match the at least one pattern of the attachment points on each of the attachment brackets. The plurality of patterns may be spaced along a length of the outer pieces of the mast.

It is to be understood that the height adjustment may be applied to an inner piece of the mast, and that an outer piece or pieces could telescopically move relative to the inner piece without departing from the spirit and scope of the present invention. Furthermore, the height adjustment of the present invention may be applied to masts that have a single outer or inner piece that supports and/or guides a movable carriage that may not telescope relative to the single piece. That is, the single piece may be pivotally supported on mounting beams in a truck at selectively adjustable positions along the single piece. The single piece may be supported on the mounting beams by brackets as described above. Alternatively, the single piece may be supported by fasteners and holes, or by other attachment elements in or directly connected to the single piece.

In still another aspect, the invention encompasses a method of adjusting a height of a mast and fork of a truck mounted fork lift. The method may include adjusting a position of a pivot connection of a mast to a mounting beam along a height of the mast. The mounting beam may be a mounting beam that is adapted to be supported on a truck. The method may also include removably attaching the pivot connection to the mast. The method may further include adjusting a position of a tilt hydraulic ram connection of a mast along the mast. The steps of adjusting and attaching may include a rough height adjustment for locating the mast and the forks of a truck mounted fork lift above a ground level. The method may further include finely adjusting a height of the forks above the ground level by adjusting chain bolts of the fork lift.

A special stanchion may be provided to hold the fork lift when it is separated from the truck. This stanchion may be in the form of a frame having receptacles for the forks so that a user may selectively stab the forks into the receptacles, loosen bolts or pins that support the fork lift in the truck, and drive the truck away from the fork and the stanchion. Thus, the fork lift may be stored separately from the truck when the bed of the truck is needed for other purposes. Furthermore, the stanchion may have a height adjustment mechanism for adjusting the height of the fork during mounting and removal of the fork lift to and from the truck.

The invention may include the truck fork lift (including the truck) in combination with a fifth wheel or goose neck trailer. The fifth wheel or goose neck trailer may be an approximately fourteen foot trailer having greater than or equal to a 15,000 pound capacity. The mast may be short enough to permit movement in and out of low profile openings such as residential garages. In most cases, the fifth wheel or ball hitch will be located forward of the mounting beams. Alternatively, the fifth wheel or ball hitch and supporting structure in the truck may be modified to accommodate both of the fork lift and the hitch. Alternatively, the fifth wheel or ball hitch may be connected to the channel type frame. Furthermore, the trailer may have a hydraulic cylinder jack for raising the hitch portion of the trailer for easy connect and disconnect from the truck.

Additionally, the combination may include a pallet buggy that is similar in form to an engine pulling device, but which is self propelled and has a pallet fork connected to the hoist thereof. This pallet buggy is useful for moving loaded pallets into and out of tight spaces in which the truck fork is not capable of entering or exiting. The pallet buggy may be stored on the trailer along with two rows of two pallets each. This combination of devices enables the methods of using outlined in the detailed description section below. The combination of devices and the method of using them clarifies the invention. Advantageously, the method incorporating the truck fork lift may reduce unloading time by 15 to 20 minutes per delivery and the user may operate the fork lift from the safety of his or her truck cab.

In a simple form, a truck fork lift in accordance with the present invention may include a fork lift mast mounted on a bed of a truck, a fork plate slidably mounted on the mast, a lift actuator connected to the mast and to the fork plate for moving the fork plate along the mast, and at least one tilt actuator connected to the bed of the truck and to the mast for tilting the mast. The truck fork lift has a deployed position of use in which the mast is generally positioned rearwardly of the bed in a generally upright orientation and a stowed position in which the mast is positioned in overlying relation to the bed. The mast is pivotably mounted on the bed of the truck. The truck fork lift may further include a fork pivotably supported on the fork plate so that the mast is pivoted into the overlying relation and the fork is separately pivoted to rest in the bed in the stowed position.

The truck fork lift may include a first hydraulic pump hydraulically connected to the lift actuator and a second hydraulic pump hydraulically connected to the at least one tilt actuator. It is to be understood that the pumps are hydraulically connected to the actuators through valves. First and second control switches may be operatively connected to respective first and second hydraulic pumps to provide an electric over hydraulic control.

The truck fork lift may include a tool box mounted in a forward end of the bed, the tool box having open channels therethrough. Channels may receive at least some of the mounting beams that also support the fork lift in the bed of the truck. A first hydraulic pump may be hydraulically connected to the lift actuator and a second hydraulic pump may be hydraulically connected to the at least one tilt actuator by respective valves. The first and second pumps may be supported in a portion of the tool box.

The truck fork lift may further include a viewing mechanism including at least one of a camera or a mirror supported on at least one of the truck, the mast, and the fork for viewing a stabbing of the fork by the driver located in a cab of the truck. When the viewing mechanism includes at least one camera, the truck fork lift further includes at least one monitor operatively connected to the at least one camera. The monitor may thus display images captured by the at least one camera for viewing by a driver while seated in the cab and operating the truck to stab the fork. The truck fork lift may further include a plurality of cameras. At least one of the plurality of cameras may be mounted on the mast and at least another of the plurality of cameras may be mounted on the fork plate or fork.

The truck fork lift may also include a fifth wheel or ball hitch connected to a chassis of the truck either directly or via the mounting beams.

In another aspect, a pallet buggy of the present invention may include a buggy chassis, at least three wheels supported on the chassis, a boom adjustably mounted on the chassis, and a lift actuator connected to the chassis and the boom. The pallet buggy may include a motor supported on the chassis.

The motor may be drivingly connected to at least one of the wheels and to the lift actuator for selectively driving the buggy and running the actuator. The pallet buggy chassis may have a space therein between at least two of the wheels for receiving a load in the space for engagement and lifting by the buggy. The pallet buggy may further include a fork suspended from the boom for engaging and supporting a load to be lifted and transported by the pallet buggy. At least one of the wheels may be a steering wheel. The pallet buggy may further include at least one steering actuator for guiding the steering wheel. The drive wheel may also be the steering wheel. The pallet buggy may be a self propelled and hydraulically actuated buggy.

A system for loading and hauling in accordance with the present invention may include a truck, a lift mounted in a bed of the truck, a trailer connectable with the truck, and a pallet buggy. The system may also include ramps supported on an underside of the trailer for loading the pallet buggy on the trailer. The lift may include a boom pivotally and adjustably mounted in the bed. The lift may be a fork lift including a fork lift mast pivotally mounted in the bed. The trailer may be a fifth wheel or goose neck trailer, for example. The system may further include a fifth wheel or ball hitch mounted in the bed of the truck for selectively connecting the trailer to the truck. The trailer may further include at least one trailer lift mounted on a front end of the trailer for unhitching a loaded trailer.

In one aspect, the mast may be an extensible mast for increased height capacity. By way of example and not by way of limitation, the mast may be extensible to heights of approximately twenty feet or greater. Thus. the system may further include at least one stand on a corner of the truck. The stand may be in the form of an adjustable lift that can be actuated to support the truck in a particular position to reduce movement of the truck during operation of the extensible fork lift. Furthermore, a plurality of stands or lifts may be provided for reducing movement of the truck during use of the extensible fork lift.

In still another aspect, the invention includes a method of loading and hauling loads. This method may include supporting a hydraulic lift in a bed of a truck, lifting a load with the lift, and placing the load in one of the bed of the truck or on a trailer. The overall load may be in a range from approximately 200 pounds to a maximum permitted by the state and local laws. On the other hand, individual pallets will most likely not exceed 7,000 pounds of weight. The step of placing may include placing the load on the trailer. The step of lifting may include lifting the load with a fork slidably supported on a mast. The step of supporting may include pivotably supporting the mast on the bed of the truck. In this aspect, the method may include unhitching the trailer from the truck by at least one electric powered hydraulic trailer lift. In fact, the method may include unhitching the trailer in a loaded condition at a point of delivery by at least one electric powered hydraulic trailer lift.

Advantageously, the method may include removing the load from the trailer by the hydraulic lift in the bed of the truck. The method may also include a preliminary step of lifting the load with a self propelled pallet buggy. This step would include moving the load to a location that is more accessible to the hydraulic lift.

In the case where the hydraulic lift is a fork lift, the method may include stabbing the load by operating the truck from within a cab of the truck. In this case, the method includes capturing images of a relationship between a fork and the load and displaying the images on a screen in the cab. The method may further include viewing the images on the screen and controlling at least one of the truck and the lift from within the cab based on the images on the screen.

In still another aspect, the invention includes a stanchion for supporting the mast and forks of a fork lift in a condition separated from a truck. The stanchion may include an elongate base, an upright stand supported on the elongate base, and at least one fork receiver extending longitudinally in at least partially overlying relation to the elongate base. The fork receiver may have an opening that is in a range of approximately 2 inches to approximately 6 inches in a vertical direction. The elongate base may include a plurality of skids having lengths in a range from approximately 4 feet to approximately 12 feet. The fork receiver may include a plurality of tubular members for receiving each of a plurality of forks of the fork lift to support the forks and the mast separate from the truck.

The foregoing and other features and advantages of the present invention will be apparent from the following more detailed description of the particular embodiments of the invention, as illustrated in the accompanying drawings.

BRIEF DESCRIPTION OF THE DRAWINGS

FIG. 1D is a perspective view of a pair of adjustment brackets for height adjustably mounting a truck fork lift mast in a truck according to an embodiment of the present invention;

FIG. 1E is an exploded perspective view of one of the adjustment brackets of FIG. 1D showing mounting possibilities for adjusting a height of a truck mounted fork lift;

FIG. 1F is a diagrammatic end view of the adjustment bracket supported on the mast of FIG. 1E;

FIG. 2A is a diagrammatic perspective view of a tool box configured according to the embodiment of FIG. 1 of the present invention that may advantageously help to support the truck fork lift in the truck;

FIG. 2B is a diagrammatic top plan view of the tool box and beams of FIG. 2A with the tool box in an open empty condition;

FIG. 2C is a detailed diagrammatic top plan view of a portion 2C of FIG. 2B with the tool box in a use condition containing components of the present invention;

FIG. 2D is a diagrammatic top plan view of a control box in accordance with an embodiment of the present invention;

FIG. 2E is a diagrammatic top plan view of a control box and transceiver in accordance with another embodiment of the present invention;

FIG. 3B is a diagrammatic side view of the truck fork lift of FIG. 1A and a portion of a trailer in accordance with FIG. 3A;

FIG. 3C is a diagrammatic front plan view of the trailer of FIG. 3B;

FIG. 3D is a diagrammatic rear plan view of the truck fork lift of FIG. 3B;

DETAILED DESCRIPTION OF EMBODIMENTS OF THE INVENTION

As discussed above, embodiments of the present invention relate to truck fork lifts and other related devices for loading and hauling medium sized loads.

Figure 1A:
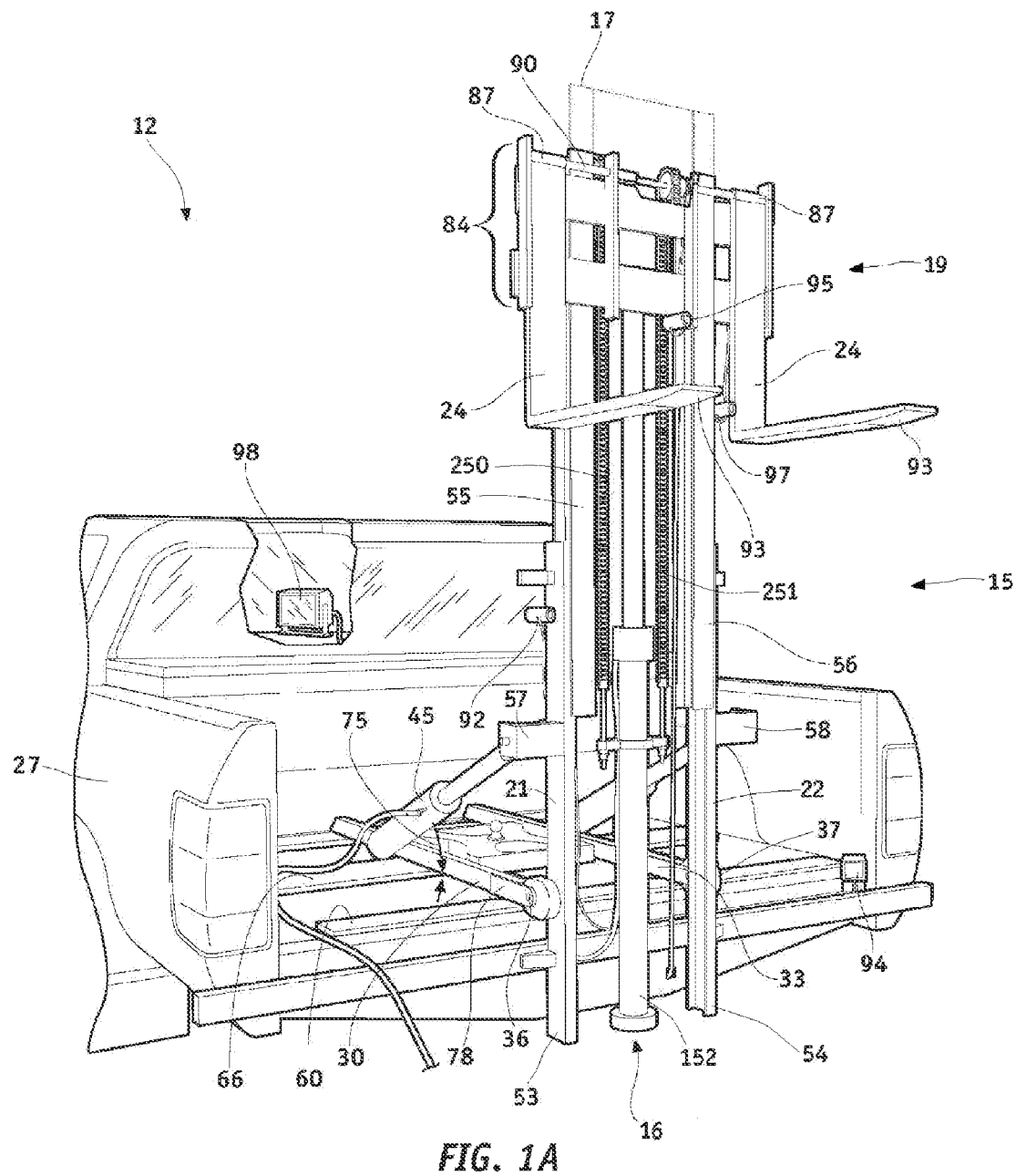
FIG. 1A is a perspective and diagrammatic view of a truck fork lift mounted in a truck according to an embodiment of the present invention.

As shown in FIG. 1A, a pickup truck and fork lift combination 12 includes a pickup truck 18 and fork lift 15. The pickup truck and fork lift combination 12 facilitates easier, faster, and safer loading and transport of medium sized loads. Medium sized loads for the purposes of the present invention are defined as loads having a weight in a range from approximately 200 pounds to approximately 3,000 pounds. The fork lift 15 is a fork lift having a capacity rating of 1,000 to 7,000 pounds. The fork lift 15 is an extensible fork lift as indicated by the break line and dashed extension at 17 in FIG. 1A Likewise, the pickup truck 18 is a truck having a manufacturer's rating of 3,400 to 7,000 pounds. Alternatively, the pickup truck may be modified to include a suspension with a 5,000 pound rating or a 7,000 pound rating, for example. Larger trucks and fork lifts having higher capacity ratings can also be implemented in accordance with the present invention. Nevertheless, loads weighing in the range from approximately 200 pounds to approximately 7,000 pounds may be lifted by the lifts of the present invention.

As shown, the fork lift 15 includes fork lift masts 21 and 22 and forks 24. The masts 21 and 22 are pivotally supported above a truck bed 27 of pickup truck 18 by a pair of fore and aft extending channel beams 30 and 33, respectively. These beams 30, 33 are mounted to a truck frame or chassis 336 (FIG. 5A) by bolts or other mounting structure that passes through the truck bed 27. The channel beams 30, 33 are sometimes referred to as mounting beams. Alternatively, the channel beams 30, 33 may form part of the chassis 336. This may be accomplished by modifying the truck frame 336 to include the beams 30, 33, or the beams 30, 33 may be incorporated as part of the chassis 336 during the original manufacture of the pickup truck 18. Pivot connections 36 and 37 (FIGS. 1A, 2B and 1C), which are at the rear end of the bed 27, and beams 30, 33 enable masts 21 and 22, respectively, to rotate from the vertical position of use shown in FIG. 1A into a stored and transport position laying more or less flat in the bed 27. Hydraulic rams 45 and 46 are connected to the channel beams 30 and 33, respectively, and to corresponding masts 21 and 22 for selectively moving the fork lift 15 from a vertically oriented position of use to a stowed position of transport with the mast lying generally flat or in an overlying relation in the truck bed 27 of the pickup truck 18. Hydraulic rams 45 and 46 are connected to corresponding masts 21 and 22 through fork lift mast brackets 57 and 58, respectively. Fork lift mast brackets 57 and 58 are connected to masts 21 and 22, respectively.

Figure 1B:
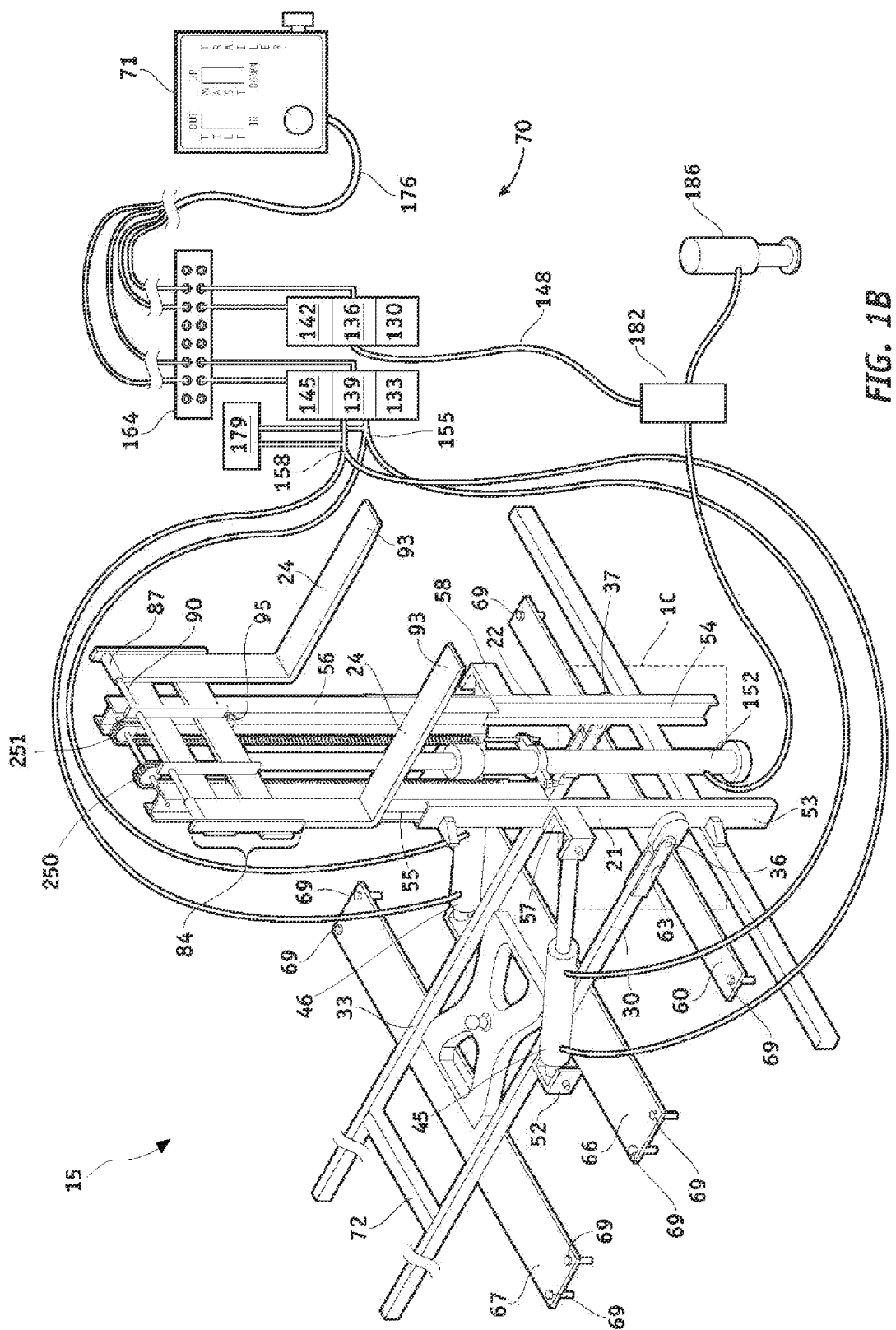
FIG. 1B is a diagrammatic perspective view of the truck fork lift of FIG. 1A separated from the truck.

Other arrangements can alternatively be implemented for raising and lowering the fork lift masts 21 and 22 relative to the beams 30, 33 and the truck bed 27 of the pickup truck 18. One such arrangement involves the hydraulic rams 45 and 46 being connected to a linkage that extends between and is connected to each of the masts 21 and 22, and the beams 30, 33. In this linkage version, the linkage arms may be moved from a doubled condition into a relatively straight condition as the fork lift masts 21 and 22 are moved from a stowed position into a vertical position of use. In any case, one or more tilt rams 45 and 46 may be incorporated, and the hydraulic rams 45 and 46 can also provide tilting adjustment of the masts 21 and 22 during use such as for positioning the forks in order to lean a load toward the masts during transport. The hydraulic rams 45 and 46 may be mounted to a block or mounting plate 52 connected to the beams 30, 33 or to the truck frame 336 generally at or below the level of the truck bed 27, as shown in FIG. 1B. Furthermore, the pivot connection 36 of the mast may be close to the level of the bed 27 so that the mast may be pulled and pushed in and out of an overlying relationship relative to the truck bed 27 and beams 30, 33.

Further alternatively, one or more hydraulic rams 45 may be positioned under the bed 27 of the truck and connected to a lower end 53 of the mast 21. While this configuration has the advantage of enabling a lower profile stowed position of the mast 21 in the truck bed 27, locating the hydraulic rams 45 under the bed 27 and connecting them to the frame of the truck may occupy a space that otherwise would be used for storage of a spare tire.

In one exemplary embodiment, a suspension of the truck 18 may have six main springs and five overload springs at each of the rear wheels. The springs may be adjusted so that the lowest overload spring is in a range from approximately one half to three fourths of an inch above the lowest main spring. In this configuration, the truck will only squat slightly before engaging the overload springs. For example, the truck 18 having this spring configuration and having the truck fork lift 15 and associated components on the truck 18 without any additional load may squat just enough to engage or almost engage the overload springs. This may be important in order to ensure that the truck maintains a proper clearance for a lower end 53 of the fork lift mast. As may be appreciated from FIG. 1A, the lower end 53 of the mast may have a clearance of approximately twelve to fourteen inches in a non-loaded state. When fully loaded, the rear suspension of the truck will engage the overload springs and may only squat approximately four inches, leaving a minimum of approximately eight inches of clearance from the ground. This amount of clearance is excellent when compared to a regular clearance in a range from approximately three to four inches between a lower end of a mast and the ground for a standard fork lift. Standard fork lifts are configured to have the forks extend downwardly a maximum of approximately two to four inches from the lower end of the mast. The capability of extending the forks downwardly from the lower end of the mast enables the forks to engage or nearly engage the ground so that they may slide under low set loads, such as when stabbing the forks into and engaging a pallet. With the mast 21 of the present invention, the forks must be extended downwardly by approximately fifteen inches more than standard forks in order to compensate for the clearance between the lower end 53 of the mast 21 and the ground. With this clearance and these modifications, the truck and fork lift 12 is well adapted for any terrain having medium to great contours. For example, the truck and fork lift 12, having a fourteen inch non-loaded clearance for the lower end 53, may back a load of three thousand to three thousand eight hundred pounds down a twenty degree slope into a garage having a level floor and maintain a clearance of nine inches or more.

As shown in FIG. 1B, the fork lift 15 is provided as a separate apparatus that is retrofitted to an existing truck. Alternatively, the fork lift 15 may be provided as an integral part of a truck during manufacture. In either case, all or part of the fork lift 15 may be easily removed to enable more space and/or other uses of the truck bed 27, such as for hauling loads that will not otherwise fit in the bed 27. In FIG. 1B, the fork lift is shown as a separate apparatus that may be removed together with the beams 30, 33. The beams 30 and 33 that support the truck fork lift 15 may be welded or otherwise attached to flat stock material 60 as shown by welds at 63. While the flat stock material 60 is shown as a laterally extending strip near a rear end of the bed 27 and beams 30, 33 in FIGS. 1A and 1B, the flat stock material could alternatively cover a larger area of the bed 27. In fact, the flat stock material could cover almost an entire area of the bed 27. Further alternatively, the flat stock material can be provided in selected areas, such as those occupied by flat stock material 66 and 67, which may correspond to underlying cross members in a frame of the truck 18. Thus, bolts 69 may be used to connect the flat stock material 60 to the underlying cross members of the truck frame or chassis. In this embodiment, the fork lift 15 includes flat stock material 60 positioned between the mounting beams 30 and 33 and the truck bed 27. In some embodiments, first and second detachable attachment mechanisms 69 (FIG. 5A) are spaced apart from the flat stock material 60.

A hydraulic actuation system 70 including a control box 71 is shown schematically in FIG. 1B. The hydraulic actuation system includes pumps, solenoids, motors, hydraulic lines, and electric lines all connected as will be described below. The control box 71 is shown in a particular configuration in FIG. 1B, which functions substantially in accordance with the other embodiments described more particularly below. In any case, the control box 71 has controls for actuating the hydraulic pumps and solenoids to move the fork plate up and down and the tilt the mast in and out.

A beam cross member 72 is provided to connect the beams 30 and 33 for greater stability and strength. Furthermore, a space 75, as shown in FIG. 1A, is provided between a majority of the beams 30 and 33 and the bed 27 of the truck. This space 75 may advantageously enable the beams 30 and 33 to flex under the heavy loads that will be applied thereto during use. It is to be understood that the flat stock material 60, 66, 67, cross member 72, and other structural members may alternatively include strengthening contours in order to advantageously increase a strength to weight ratio of the mounting and strengthening structure of the fork lift 15 and the truck frame. Hence, in this embodiment, the first and second mounting beams 30 and 33 are spaced apart from the truck bed 27. In these embodiments, the mounting beams 30 and 33 are positioned above the truck bed 27 of the pickup truck 18.

Figure 1C:
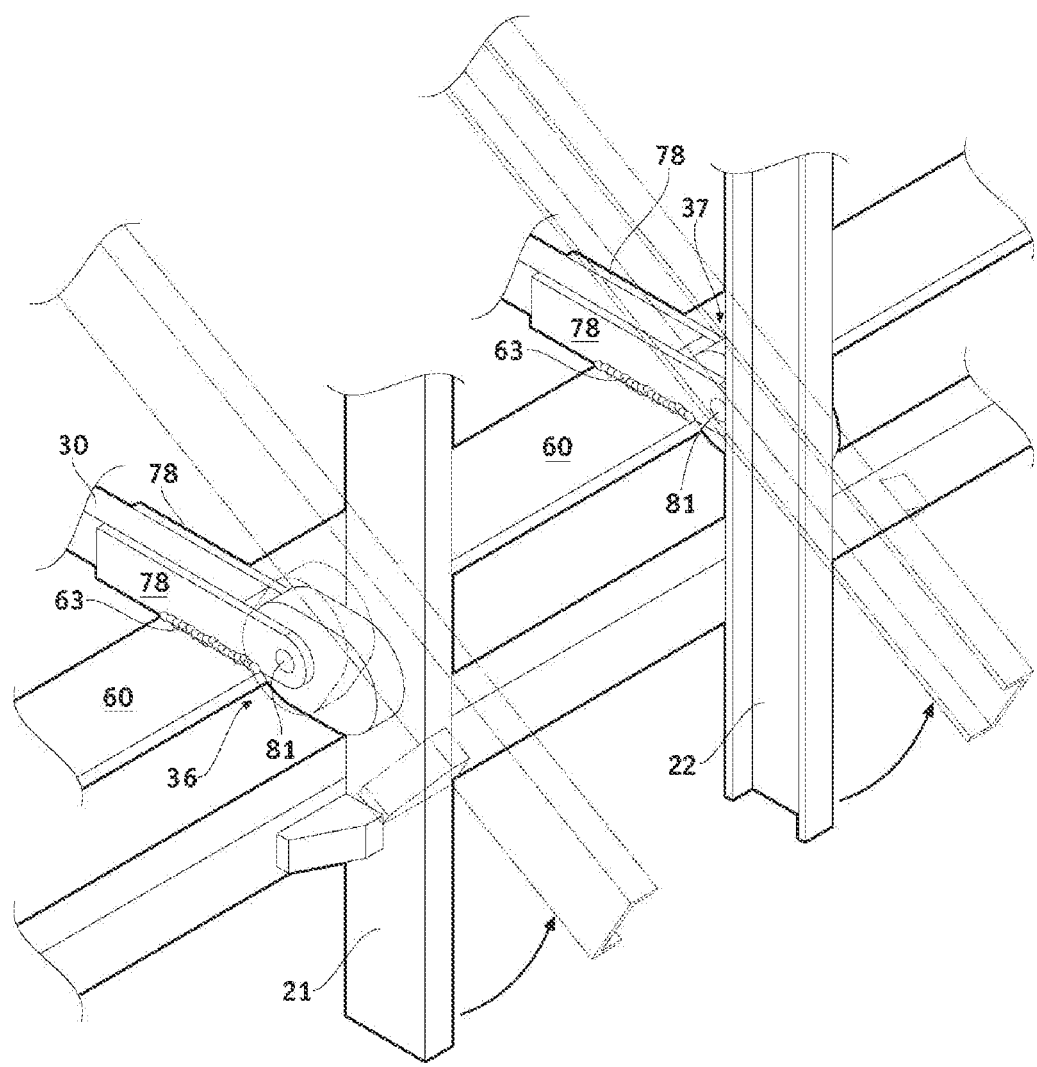
FIG. 1C is diagrammatic perspective view of a portion of the truck fork lift of FIG. 1B with the forks in a lowered position and showing additional details.

As shown in FIG. 1C, a pair of frame members 78 straddle each of the mounting beams 30 and 33 and form brackets with pivot holes 81 for the pivot connections 36 with the mast 21. These frame members may be adjustable from a position of use shown in FIGS. 1A and 1C to a stowed position rotated from a horizontal orientation by up to ninety degrees or more, for example, so that the tail gate of the truck may be closed without obstruction. Furthermore, the frame members 78 may be formed integrally with or be rigidly connected to the mast for insertion or receipt on ends of the mounting beams 30, 33 and attachment thereto by a pivot pin, for example.

A fork plate 84 is slidably supported on the mast 21 in a known manner. Forks 24 may be supported on the fork plate 84. As shown in FIGS. 1A and 1B, the forks 24 may be pivotally and slidably connected to the fork plate 84 by sleeves 87 that engage a rod 90 of the fork plate 84. Thus, when the mast 21 is folded into the stowed position lying generally flat in the bed 27 of the truck 18, the forks 24 can be manually rotated so that tips 93 rotate and engage the bed 27 of the truck 18.

Tips of the forks 24 may be received in pockets in the rotated stowed position as shown and described in U.S. patent application Ser. No. 11/207,137, filed Aug. 17, 2005, and entitled FORK LIFT ATTACHMENT TOOLS AND METHODS, the disclosure of which is incorporated herein by reference. Alternatively, the forks 24 may be formed to include a pivot at a junction between the regularly vertical portion and the regularly horizontal portion. Thus, during non-use or stowing of the mast 21 and/or fork 24, the regularly horizontal portion of the fork 24 may be folded to overly or be adjacent to the regularly vertical portion. Therefore, the mast 21 and fork 24 can be folded substantially flat in the bed 27 of the truck 18 so that there is no need for a customized goose neck trailer to be used with the truck mounted fork lift.

As shown in FIGS. 1A and 1C, the truck fork lift 15 may further include a viewing mechanism with at least one of a camera 92 or a mirror supported on the mast, for example. One or more additional cameras 94, 95, 97 or mirrors may be mounted on the fork plate 84 or fork 24. These cameras 92, 94, 95, 97, and/or mirrors, may be provided for viewing the relationship between the truck fork lift 15, forks 24, and a load during stabbing of the forks 24. A monitor 98 may be remotely located in the cab of the truck, for example, for viewing by a driver also located in a cab. The monitor 98 may thus display images captured by the at least one camera 92, 94, 95, 97 for viewing by a driver while seated in the cab and operating the truck to stab the fork. When minors are implemented, it is to be understood that a durable stainless steel device can provide a durable yet effective mirror.

Hence, fork lift 15 is attached to a truck frame 336 (FIG. 5A) of the truck 18. In one embodiment, the fork lift 15 includes a fork lift mast assembly 16 pivotably coupled to first and second mounting beams 30 and 33 through tilt actuators 45 and 46, respectively. The first and second tilt actuators 45 and 46 are connected between the first and second mounting beams 30 and 33, respectively, and the fork lift mast assembly 16. The first and second tilt actuators 45 and 46 are connected to the fork lift mast assembly 16 through fork lift mast brackets 57 and 58, respectively. The fork lift mast assembly 16 is repeatably moveable between positions extending parallel and perpendicular to the truck bed 27 in response to actuating actuators 45 and 46.

Figure 5A:
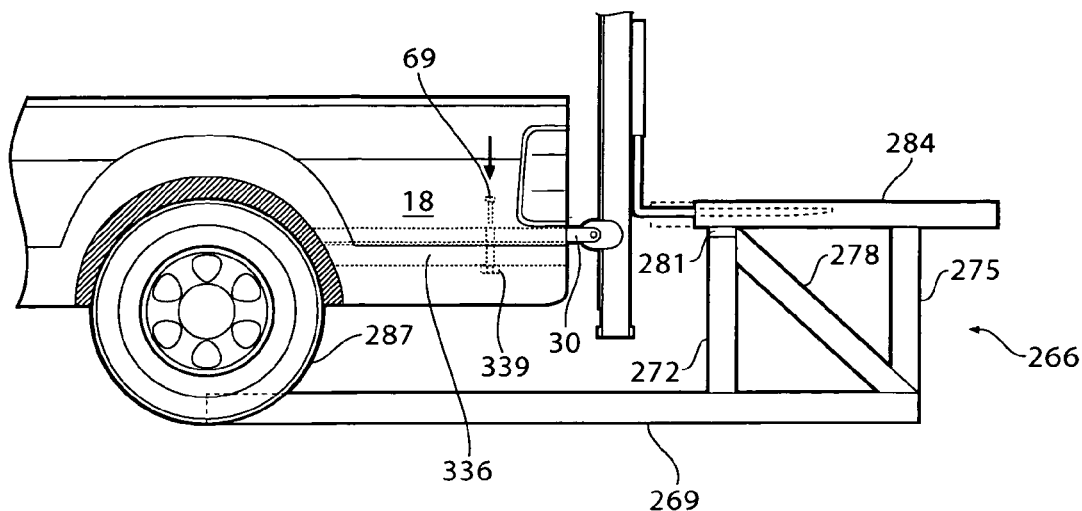
FIG. 5A is a diagrammatic side view of a fork lift stanchion for supporting the fork lift of the present invention in a condition separate from the truck.

In this embodiment, the first and second mounting beams 30 and 33 are carried by the truck frame 336. A truck bed 27 is positioned between the truck frame 336 and the first and second mounting beams 30 and 33. In this way, the first and second mounting beams 30 and 33 are positioned above the truck bed 27 of the truck 18. In some embodiments, the distal ends of the first and second mounting beams 30 and 33 extend beyond the rear of the truck bed 27 (FIG. 5A). The fork lift mast assembly 16 is pivotably connected to the first and second mounting beam 30 and 33 proximate to the rear of the truck bed 27. In particular, fork lift mast assembly 16 is pivotably connected to mounting beam 30 at pivot connection 36, and fork lift mast assembly 16 is pivotably connected to mounting beam 33 at pivot connection 37.

In this embodiment, the fork lift 15 includes a plurality of detachable attachment mechanisms 69 connecting the first and second mounting beams 30 and 33 to the truck frame 336. The plurality of detachable attachment mechanisms 69 extend through the truck bed 27 of the truck 18. The truck bed 27 includes an opening through which the detachable attachment mechanism 69 extends. In some embodiments, the detachable attachment mechanisms 69 extend through openings of the truck bed 27. As shown in FIG. 5A, detachable attachment mechanism 69 is positioned between a rear of the truck bed 27 and a rear wheel 287 of the truck. In this way, at least one of the detachable attachment mechanisms 69 is positioned between a rear of the truck bed 27 and a rear wheel 287 of the truck 18. In this embodiment, detachable attachment mechanism 69 extends through the truck bed 27, and has one end engaged with the truck frame 336 and an opposed end engaged with the mounting beam 30 (FIG. 5A). It should be noted that, in this embodiment, another attachment mechanism 69 has an end connected to the truck frame 336 and an opposed end connected to the second mounting beam 33. In some embodiments, the first and second detachable attachment mechanisms 69 extend perpendicular to the first and second mounting beams 30 and 33, respectively. In this embodiment, the first and second detachable attachment mechanisms 69 connect the first and second mounting beams 30 and 33, respectively, to the truck frame 336. In this embodiment, the first and second attachment mechanisms 69 are engaged with the truck frame 336 and first and second mounting beams 30 and 33, respectively.

In this embodiment, the fork lift 15 includes a fork lift carriage 19 carried by the fork lift mast assembly 16. The fork lift carriage 19 is repeatably slideable between raised and lowered positions relative to the fork lift mast assembly 16. The fork lift mast assembly 16 includes a fork lift hydraulic ram 152. The fork lift carriage 19 is repeatably slideable between raised and lowered positions relative to the fork lift mast assembly 16 in response to actuating the fork lift hydraulic ram. In this way, the fork lift carriage 19 slides along the fork lift mast assembly 16 in response to actuating the fork lift hydraulic ram 152.

In this embodiment, the fork lift 15 includes first and second mast chains 250 and 251 which are coupled to the fork lift carriage 19. The first and second mast chains 250 and 251 are coupled between the first and second sliding mast arms 55 and 56, respectively, and the fork lift hydraulic ram 152. In this embodiment, first and second mast chains 250 and 251 are coupled to fork lift hydraulic ram 152 through chain bolts 73 and 74, respectively. The fork lift hydraulic ram 152 is operatively coupled to the fork lift carriage 19 through the first and second mast chains 250 and 251.

In this embodiment, the fork lift mast assembly 16 includes first and second pivot mast arms 21 and 22 pivotably connected to the first and second mounting beam 30 and 33, respectively. In particular, the first and second pivot mast arms 21 and 22 pivotably connected to the corresponding first and second mounting beam 30 and 33 through actuators 45 and 46, respectively. In this embodiment, the first and second pivot mast arms 21 and 22 are C-channel beams.

In this embodiment, the fork lift mast assembly 16 includes first and second sliding mast arms 55 and 56 slidingly engaged with the first and second pivot mast arms 21 and 22, respectively. The first and second sliding mast arms 55 and 56 slide relative to the first and second pivot mast arms 21 and 22 in response to actuating the fork lift hydraulic ram 152. In this embodiment, the first and second sliding mast arms 55 and 56 are I-channel beams.

FIGS. 1D-1H are various views of adjustment bracket assemblies. The adjustment bracket assemblies are positioned proximate to a rear of the vehicle 12. FIG. 1D shows adjustment bracket assemblies 31 and 32 that enable the height adjustment of the mounting of the masts 21 and 22, respectively, of FIGS. 1A and 1B. Thus, the pair of adjustment bracket assemblies 31 and 32 provide a mast adjustment mechanism and method. In this embodiment, adjustment bracket assemblies 31 and 32 include bracket attachment plates 34 and 35, respectively. The bracket attachment plates 34 and 35 have a plurality of mounting positions defined by a plurality of bracket attachment elements 25 and 26, respectively. The bracket attachment elements 25 and 26 include mounting holes 40 and 41, respectively, or other attachment structure to enable the mounting of the masts 21 and 22 at a variety of heights so that the fork lift 15 is supported relative to truck bed 27 at a corresponding variety of heights. Thus, the present invention may be more readily and more practically used in conjunction with a wider variety of trucks. For example, the truck fork lift 15 of the present invention may be provided as a kit which includes the bracket attachment plates 34 and 35 so that the height of the masts 21 and 22 can be selected to reach to an appropriate level above the ground for any of a variety of truck brand and suspension combinations. The suspension of a truck may have a capacity of at least one-half ton, three-quarters ton, one ton, two tons, etcetera. With these variations and the other variations incorporated by the components of the various brands of trucks, it is contemplated that a height of the bed above a ground level may range from approximately thirty-two inches to approximately forty-six inches. (See FIGS. 3B and 5A for a representation of the height of the truck bed above the ground.)

Alternatively, the truck fork lift 15 of the present invention could be built in a plurality of configurations in which the attachment locates the forks at the right position to be able to reach substantially to the ground for a respective plurality of truck configurations. In this case, the truck fork lifts would be configured and built to be accommodated on trucks that would most likely be used to support the respective truck fork lifts. The number of configurations for this purpose would most likely be limited, and the lack of adjustability would likely result in greater challenges in determining how many of each configuration to stock and how to respond to excess inventory for dealers. Thus, while plural configurations of non-adjustable truck fork lifts may have strength and structural advantages, the adjustment mechanism provided by adjustment bracket assemblies 31 and 32 or some other analogous mechanism provides advantages to dealers. Furthermore, providing the truck fork lift in a single adjustable configuration will also provide supplying and manufacturing advantages.

Figure 1G:
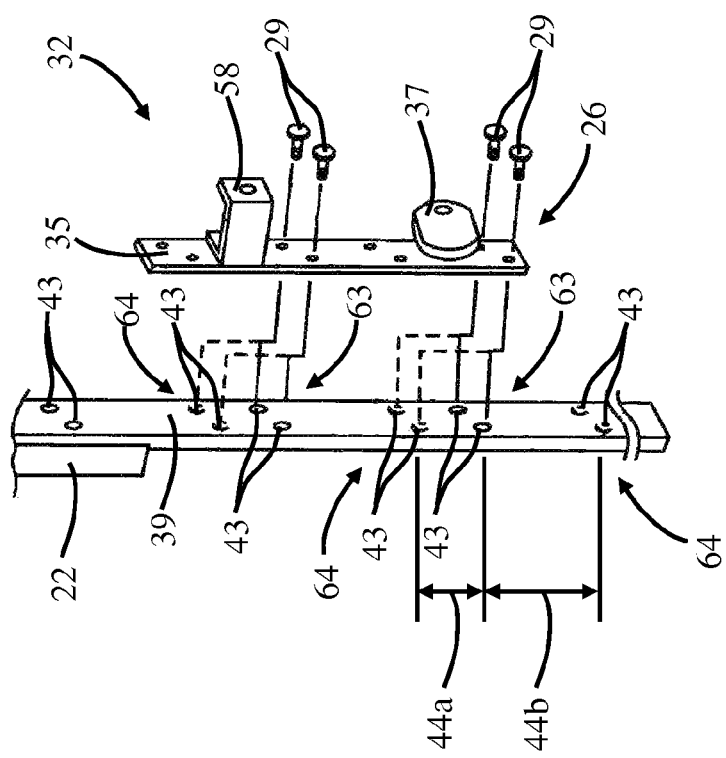
FIG. 1G is an exploded perspective view of another one of the adjustment brackets of FIG. 1D showing mounting possibilities for adjusting a height of a truck mounted fork lift.

Bracket attachment plate 34 includes a repeating pattern of mounting holes 40, and bracket attachment plate 35 includes a repeating pattern of mounting holes 41. It is to be understood that the patterns shown are not required. Rather, any pattern may be implemented within the spirit and scope of the present invention. In particular, strength characteristics of a particular material and configuration of the bracket attachment plates 34 and 35 with holes at selected positions may be analyzed and optimized for the bracket attachment plates 34 and 35 of the present invention. A corresponding pattern of mounting holes 42 is provided in a mast attachment plate 38, wherein the mast attachment plate 38 is attached to the mast 21, as shown in FIG. 1E. Similarly, analysis of strength characteristics of the mast attachment plate 34 with selected patterns of mounting holes 42 may be made to determine what patterns and locations of the mounting holes 42 will not weaken the mast inordinately. One of the benefits that may be obtained is to maintain a minimum rating for loads to be supported by the mast 21. A corresponding pattern of mounting holes 43 is provided in a mast attachment plate 39, wherein the mast attachment plate 39 is attached to the mast 22, as shown in FIG. 1G. Similarly, analysis of strength characteristics of the mast attachment plate 39 with selected patterns of mounting holes 43 may be made to determine what patterns and locations of the mounting holes 43 will not weaken the mast inordinately. One of the benefits that may be obtained is to maintain a minimum rating for loads to be supported by the mast 22.

As shown in FIG. 1E, a first set of bolts 28 are provided having two or three pairs of bolts 28. (Two pairs of bolts are shown. However, three or more pairs may be used instead.) The two pairs of bolts 28 are threadedly engaged through the mounting holes 40 (shown in solid lines and corresponding to bracket attachment element 26) in the bracket attachment plate 34 and the mounting holes 42 (shown in solid lines and corresponding to a mast attachment element 61) in the mast attachment plate 38, as indicated by the exploded view solid assembly lines. Alternatively, if the mast 21 is to be mounted relative to truck bed 27 at a greater height, then the bolts 28 are threadedly engaged through the mounting holes 40 (shown in solid lines corresponding to the bracket attachment element 26) on the bracket attachment plate 34 and through the mounting holes 42 (shown in dashed lines and corresponding to mast attachment element 62) on the mast attachment plate 38, as indicated by exploded view dashed assembly lines in FIG. 1E. As may be appreciated, this adjustment will move the mast 21 downwardly relative to the bracket attachment plate 34, and closer to the ground level. As shown, the amount of adjustment may be of a dimension 44a between the closest adjacent pairs of mounting holes 42. This dimension may be approximately five inches, for example. A distance 44b between farthest adjacent pairs of mounting holes may be approximately seven inches. Thus, by adjusting the mast 21 relative to the bracket attachment plate 34 by two increments of approximately five inches and approximately seven inches respectively, the mast 21 may be adjusted by approximately twelve inches. As discussed below, this same adjustment method may be applied to the bracket attachment plate 35 in an analogous manner. Additional finer adjustments of the minimum level of the forks 24 may be made by adjusting the chain bolts 73 and 74, which are shown in FIGS. 1A and 1B. Thus, a range of adjustment for the mast 21 and forks 24 for mounting of the truck fork lift 15 on trucks having a full range of truck bed heights may easily and advantageously be achieved.

As shown in FIG. 1G, a first set of bolts 29 are provided having two or three pairs of bolts 29. (Two pairs of bolts are shown. However, three or more pairs may be used instead.) The two pairs of bolts 29 are threadedly engaged through the mounting holes 41 (shown in solid lines and corresponding to bracket attachment element 26) in the bracket attachment plate 35 and the mounting holes 43 (shown in solid lines and corresponding to a mast attachment element 63) in the mast attachment plate 39, as indicated by the exploded view solid assembly lines. Alternatively, if the mast 22 is to be mounted relative to truck bed 27 at a greater height, then the bolts 29 are threadedly engaged through the mounting holes 41 (shown in solid lines corresponding to the bracket attachment element 25) on the bracket attachment plate 35 and through the mounting holes 43 (shown in dashed lines and corresponding to mast attachment element 64) on the mast attachment plate 39, as indicated by exploded view dashed assembly lines in FIG. 1G. As may be appreciated, this adjustment will move the mast 22 downwardly relative to the bracket attachment plate 35, and closer to the ground level. As shown, the amount of adjustment may be of dimension 44a between the closest adjacent pairs of mounting holes 43. This dimension may be approximately five inches, for example. Distance 44b between farthest adjacent pairs of mounting holes may be approximately seven inches. Thus, by adjusting the mast 22 relative to the bracket attachment plate 35 by two increments of approximately five inches and approximately seven inches respectively, the mast 22 may be adjusted by approximately twelve inches. As discussed above, this same adjustment method may be applied to the bracket attachment plate 34 in an analogous manner. Additional finer adjustments of the minimum level of the forks 24 may be made by adjusting the chain bolts 73 and 74, which are shown in FIGS. 1A and 1B. Thus, a range of adjustment for the masts 21 and 22 and forks 24 for mounting of the truck fork lift 15 on trucks having a full range of truck bed heights may easily and advantageously be achieved.

Patterns of mounting holes 40, 41 42 and 43 may be made to provide incremental adjustments in a range from approximately two inches to approximately eight inches. Other adjustment increments may be from approximately three inches to approximately six inches. Since the finer adjustment that can be accomplished by the chain bolts 73 and 74 may be in a range from approximately four inches to approximately eight inches, the adjustment increments provided by the patterns of mounting holes should be in a range from at least approximately six inches to at least approximately ten inches in order to enable adjustment through a full range of approximately fourteen inches for the highest and lowest truck beds having heights from approximately thirty-two inches to approximately forty-six inches from the ground level.

It is to be understood that other patterns are possible, and three or more bolts may be used instead of each pair for each subset of a complete set of bolts and corresponding mounting holes to be utilized in mounting the mast attachment plates 38 and 39 to the bracket attachment plates 34 and 35, respectively. Bolt sizes may be any of three-eighths inch, one-half inch, five eighths inch, #8, or #10, for example. Advantageously, different sets of bolts 28 and 29 may have different sizes and may be matched with specific holes in either the bracket attachment plates 34 and 35, the mast attachment plates 38 and 39, or both. Thus, a set of bolts 28 and 29 having particular sizes may correspond to a particular height that is determined by a particular brand of truck and a particular suspension on that truck. Therefore, mounting of the truck fork lift 15 at the appropriate height may be better assured. It is to be understood that a single pattern and set of mounting holes 40 and 41 may be provided in the bracket attachment plates 34 and 35, and that a plurality of a repeated matching patterns may be provided in the mast attachment plates 38 and 39. Alternatively, a single pattern and set of mounting holes 42 and 43 may be provided on the mast attachment plates 38 and 39, and a plurality of a repeated matching patterns may be provided in the bracket attachment plates 34 and 35. Thus, the number of mounting holes 42 and 43 in the mast attachment plates 38 and 39 may be minimized.

For explanation purposes, a pattern may correspond to an attachment element, and a plurality of patterns or attachment elements may be overlapped by placement of mounting holes of one pattern within the bounds of another pattern of mounting holes, whether in a mast piece or in a bracket for example. This is true even if the patterns are repeating patterns. Another configuration may reduce the number of mounting holes in the mast attachment plates 38 and 39 by providing two or more distinct sets of bracket attachment plates 34 and 35 with respective distinct sets of mounting holes 40 and 41 and bolts 28 and 29. The distinct sets of bolts 28 and 29 may be matched with the distinct sets of bracket attachment plates 34 and 35 for providing the desired mast heights and minimum fork heights above ground level for respective distinct combinations of truck brands and suspensions.

FIG. 1F shows an end view of the mast attachment plate 38 and an bracket attachment plate 34 with the mounted on the mast attachment plate 38 by bolts 28. Pivot connection piece 36 and hydraulic ram connection piece 57 are removed in the end view of FIG. 1F for clearer illustration. As shown in FIG. 1F, the may have a C-section configuration. Alternatively, the section may have an "L" or an "I" configuration. The configuration of the bracket attachment plate 34 may be adjusted to fit with the configuration of the mast attachment plate 38. For example, the bracket attachment plate 34 may advantageously nest in an I-sectioned mast attachment plate 38. This arrangement would provide strengthening advantages against rotation and/or separation of the bracket attachment plate 34 from the mast 21. Similar advantages may be accomplished by adding one or more flanges 50, 51 on outer edges of the bracket attachment plate 34. These flanges 50, 51 may engage over one or both edges of the mast attachment plate 38, as shown in FIG. 1F. Some mast configurations will permit application of only one of the flanges 50, 51. Some mast configurations may require that any flanges 50, 51 be shortened so as not to interfere with the telescoping movement of the mast 21 and its components. Furthermore, the flanges 50, 51 may be provided on only portions of a length of the bracket attachment plate 34.

The bolts 28 may have locking threads and be configured so that each bolt extends to a position short of the inner surface of the mast attachment plate 38. Thus, a carriage bearing or roller mounted on the telescoping inner piece of mast 21 will be able to move freely without obstruction in a channel formed between the mast 21 and the mast attachment plate 38.

While FIGS. 1D-1F show the bracket attachment plate 34 as the mechanism for adjustment of the mast height, it is to be understood that other mechanisms may be incorporated instead for the same purpose of adjustment of the mast height. For example, the holes shown in the mast attachment plate 38 in FIG. 1E may be engaged directly by the pivot connection piece 36 and the ram connection piece 57. Mounting holes 40 may be placed in the pivot connection piece 36 and the ram connection piece 57 and the bolts 28 may secure these pieces 36, 57 directly to the mast attachment plate 38. Additionally or alternatively, the mast may be marked for attachment of the pivot connection piece 36, ram connection piece 57, or by bolts, welding, or interlocking mechanisms. The mast attachment plate 38 and/or the bracket attachment plate 34 may be marked at discrete locations or points for attachment of the mast to the bracket attachment plate 34 and beams 30, 33 by welding, for example. Interlocking mechanisms may be especially advantageous for providing a quick attach and a quick release attachment. While the bracket attachment plate 34 are shown as plates having a generally rectangular configuration extending along a length of the mast attachment plate 38, the bracket attachment plate 34 may be replaced by any number of adjustment brackets having bases or mounting plates of any configuration without departing from the spirit and scope of the invention.

Figure 1H:
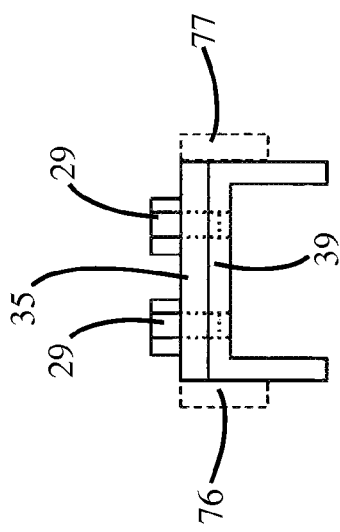
FIG. 1H is a diagrammatic end view of the adjustment bracket supported on the mast of FIG. 1G.

FIG. 1H shows an end view of the mast attachment plate 39 and an bracket attachment plate 35 with the mounted on the mast attachment plate 39 by bolts 29. Pivot connection piece 37 and hydraulic ram connection piece 58 are removed in the end view of FIG. 1H for clearer illustration. As shown in FIG. 1H, the may have a C-section configuration. Alternatively, the section may have an "L" or an "I" configuration. The configuration of the bracket attachment plate 35 may be adjusted to fit with the configuration of the mast attachment plate 39. For example, the bracket attachment plate 35 may advantageously nest in an I-sectioned mast attachment plate 39. This arrangement would provide strengthening advantages against rotation and/or separation of the bracket attachment plate 35 from the mast 22. Similar advantages may be accomplished by adding one or more flanges 76, 77 on outer edges of the bracket attachment plate 34. These flanges 76, 77 may engage over one or both edges of the mast attachment plate 38, as shown in FIG. 1H. Some mast configurations will permit application of only one of the flanges 76, 77. Some mast configurations may require that any flanges 76, 77 be shortened so as not to interfere with the telescoping movement of the mast 22 and its components. Furthermore, the flanges 76, 77 may be provided on only portions of a length of the bracket attachment plate 35.

The bolts 29 may have locking threads and be configured so that each bolt extends to a position short of the inner surface of the mast attachment plate 39. Thus, a carriage bearing or roller mounted on the telescoping inner piece of mast 22 will be able to move freely without obstruction in a channel formed between the mast 22 and the mast attachment plate 39.

While FIGS. 1D-1H show the bracket attachment plate 35 as the mechanism for adjustment of the mast height, it is to be understood that other mechanisms may be incorporated instead for the same purpose of adjustment of the mast height. For example, the holes shown in the mast attachment plate 39 in FIG. 1G may be engaged directly by the pivot connection piece 37 and the ram connection piece 58. Mounting holes 41 may be placed in the pivot connection piece 37 and the ram connection piece 58 and the bolts 29 may secure these pieces 37, 58 directly to the mast attachment plate 39. Additionally or alternatively, the mast may be marked for attachment of the pivot connection piece 37, ram connection piece 58, or by bolts, welding, or interlocking mechanisms. The mast attachment plate 39 and/or the bracket attachment plate 35 may be marked at discrete locations or points for attachment of the mast to the bracket attachment plate 35 and beams 30, 33 by welding, for example. Interlocking mechanisms may be especially advantageous for providing a quick attach and a quick release attachment. While the bracket attachment plate 35 are shown as plates having a generally rectangular configuration extending along a length of the mast attachment plate 39, the bracket attachment plate 35 may be replaced by any number of adjustment brackets having bases or mounting plates of any configuration without departing from the spirit and scope of the invention.

As shown in FIG. 2A, forward ends of the beams 30 and 33 may be supported in the bed of the truck in a special manner, which may be in addition to the flat stock material mounting of the beams 30 and 33 in the bed 27 of the truck as described above. As shown, a toolbox 96 may be provided in the bed 27 of the truck. The toolbox 96 may be mounted in the bed 27 adjacent to the cab. The toolbox 96 may be mounted to the truck frame through the bed 27 in a secure manner similar to the mounting of the flat stock material described above. The toolbox 96 may have two openings 99 and 100 near a base thereof, which openings 99 and 100 may be reinforced by respective channel members extending in the fore and aft direction. The channel members may have large enough openings to receive the beams 30 and 33. Hence the toolbox may be secured to the bed 27 of the truck and the underlying frame, and the beams 30 and 33 may likewise additionally be secured to the truck by the tool box 96 and the channel members. The toolbox 96 may have lids 103 and 106 for accessing an interior of the toolbox 96. One or more padlocks 109, or other locking device(s), may be used to secure one or both lids 103 in a closed condition to protect tools and other components against access by unauthorized persons. Hence, in this embodiment, the fork lift 15 includes tool box 96 positioned on the mounting beams 30 and 33. The tool box 96 is positioned at an opposite ends of the mounting beams 30 and 33 from the fork lift mast assembly 16. The tool box 96 includes first and second channels 99 and 100. The proximal ends of the first and second mounting beams 30 and 33 extending through the first and second channels 99 and 100, respectively. The tool box 96 is positioned proximate to one end of the mounting beams 30 and 33, and the adjustment bracket assemblies 31 and 32 are positioned proximate to the opposed ends of the mounting beams 30 and 33, respectively.

FIG. 2B is a top plan view including an interior of the toolbox 96 and the beams 30 and 33. The toolbox 96 may have an interior 112, (shown in an empty condition in FIG. 2B.) The toolbox 96 may be attached to the bed 27 of the truck by angle iron 119 extending along a forward base of the tool box 96. The angle iron 119 may be fixed to the tool box and bolted by bolts 121 or otherwise connected to frame members of the truck through the bed 27. Alternatively or additionally, a bottom wall 115 of the toolbox may be attached to the bed 27 of the truck by channel iron 118 or flat stock material. The channel iron 118 may have holes therethrough corresponding to holes in the bottom 115 of the toolbox and holes through the bed 27 of the truck. Bolts 121 may be used to secure the channel iron 118 and the toolbox 96 to the bed 27. The bolts 121 may engage in a frame of the truck below the bed 27. As shown, The channel members for receiving the mounting beams 30, 33 may be closed channels 124 that may be fixed to and extend through a bottom portion of the toolbox 96. These closed channels 124 open rearwardly into openings 99 and 100 shown in FIG. 2A. Thus the beams 30 and 33 may be received in the closed channels 124 for a secure attachment of the beams 30 and 33 to the truck bed 27 and the underlying truck frame.

FIG. 2B also shows a fifth wheel hitch 127. This fifth wheel hitch 127 may be secured directly to the beams 30 and 33, to one or more of a cross member, the flat stock material, and the truck frame through the truck bed 27. To this end, the fifth wheel hitch 127 may be secured by bolts 121 or other attachment mechanisms. It is to be understood that the fifth wheel hitch may be replaced by a ball hitch or other hitch of any of a variety of configurations.

FIG. 2C is a diagrammatic top plan view of half of the toolbox 96, generally encompassing a region corresponding to the area of the circle labeled 2C in FIG. 2B. However, FIG. 2C includes components that may be located in one side or the other of the toolbox 96. These components may include, but are not limited to, a mast pump 130 that may be a single or double acting pump; a tilt pump 133, which may be a double acting pump; first and second solenoid valves 136, 139 connected to the mast pump 130 and the tilt pump 133, respectively; and first and second electric motors 142, 145 connected to respective electric solenoid valves 136, 139. A mast hydraulic line 148 may extend from the electric solenoid valve 136 to the mast hydraulic ram 152, as may be appreciated from viewing FIGS. 2C and 1B. A tilt "in" hydraulic line 155 and a tilt "out" hydraulic line 158 may be connected to the electronic solenoid valve 139 and to the one or more tilt hydraulic rams 45.

Electricity may be carried to each of the electric motors and each of the electric solenoid valves from the truck's electrical system, a separate electrical system, or a battery by electric lines 161. These lines may be connected to a contact strip 164 which may be mounted on an inner wall of the toolbox 96 or at any other location. Corresponding electric lines may extend from the contact strip to respective control boxes 167 and 170. These control boxes may incorporate double pole-double throw spring center toggle switches. The control boxes 167 and 170 may be separate from each other or joined together as shown in FIG. 2D. The control boxes 167 and 170 may be mounted on a dash board or other stationary location, or they may form part of a pendant 173 that provides a measure of mobility to the user while operating the controls. In this regard, an electrical cable 176 connecting the power strip 164 to the control boxes 167 and 170 may have a length of between 4 feet and 8 feet, for example, to permit a user to control the fork lift 15 from within the cab, outside the cab near the truck bed, or at a small distance from the truck. The cable 176 may be connected to the control boxes by a strain relief connection to reduce strain on the wires within.

As shown in FIG. 2D, the spring center toggle switch 171 may control the single acting mast pump motor 142 and valve 136 to cause the mast to move in an upward direction, a downward direction under the influence of gravity, or to remain in a neutral stationary position as indicated by up, down, and central positions labeled on the control box 167. Alternatively, the pump motor 142 may be a double acting motor for activation in both directions. Similarly, the spring toggle 172 connected to the tilt pump motor and valve may be operated to cause the fork lift 15 to be tilted out, tilted in, or to remain in a stationary position. The corresponding positions for the spring biased toggle 172 are shown in FIG. 2D. Each of the spring toggles 171 and 172 are spring biased to a central neutral position. Therefore, the fork lift will remain in a stationary condition unless a user moves the toggle switches 171 or 172 from the neutral position into up, down, out, or in actuation positions.

It is to be understood that the present invention may thus incorporate an electric over hydraulic control system in which each position of actuation is in either an "on" or an "off" position. In order to control the speed of actuation of the rams, a restriction in the hydraulic system may be provided. Thus, relatively small movements of the fork lift may be effectuated. For fine adjustments in position, the toggles 171 and 172 can be bumped on and off for very small incremental changes in positions. Alternatively, a more complex proportional electric over hydraulic system may be implemented. Further alternatively, a purely hydraulic actuation system could be incorporated. However, doing so would require hydraulic lines to be routed into the cab of the truck, or to whatever location from which the user would actuate the system.

The electric over hydraulic system may be provided by a wireless control system with a wireless control box 177 wirelessly connected to the pumps by a transceiver/converter 178 as shown in FIG. 2E. The transceiver/converter 178 may receive and/or transmit radio frequency signals from and to the wireless control box 177 through the air. The transceiver/converter may also convert the signals from radio frequency to command signals that control the solenoids 136, 139 and the motors 142, 145. The transceiver portion of the transceiver/converter may implement a simple receiver in accordance with the present invention.

The control box 177 of FIG. 2E may include elements similar to those described with regard to the control box 167 of FIG. 2D above. For example, the control box 177 may include a spring center toggle switch 379 that controls the single acting mast pump motor 142 and valve 136 to cause the mast to move in an upward direction, a downward direction under the influence of gravity, or to remain in a neutral stationary position as indicated by up, down, and central positions labeled on the control box 177. Similarly, a spring toggle 382 connected to the tilt pump motor and valve may be operated to cause the fork lift 15 to be tilted out, tilted in, or to remain in a stationary position. The corresponding positions for the spring biased toggle 382 are shown in FIG. 2E. Each of the spring toggles 379 and 382 are spring biased to a central neutral position. Therefore, the fork lift will remain in a stationary condition unless a user moves one or more of the toggle switches 379 and 382 from the neutral position into up, down, out, or in actuation positions. As shown, the control box 177 may include additional buttons for controlling the fork lift 15. For example, a bypass button 385 may be provided for bypassing a restriction in the lines that usually slows the rate at which the ram moves. Thus, the bypass button 385 may be pressed to increase a speed of descent of the forks when, for example, they have no load so that they would otherwise descend slowly. Another safety or activation button 388 may be provided on a different face of the control box 177. In order to actuate the system in any way with the switches 379, 382, and possibly even bypass button 385, a user may be required to also press the safety button 388. It may be required to hold down the safety button 388 in order for power to be supplied to the other switches 379, 382 and/or bypass button 188. An additional main manual on/off switch may be provided on an outside of the tool box 96, for example, to provide power to the system including the control box 177. It is to be understood that the control box 71 shown in FIG. 1A may include the same features described with regard to the control box 177 and may vary therefrom in that the control box 71 of FIG. 1A is connected to the hydraulics components by wires.

As shown in FIG. 2C, a larger hydraulic reservoir 179 may be implemented with the present system to accommodate the large capacity of the mast lift hydraulic ram 152 and the one or more tilt rams 45 of the fork lift 15. Additionally, a diverter valve 182 with a manual lever 185 may be provided to manually swap the connection of the mast pump to one or more trailer supporting rams as will be described in greater detail below. The diverter valve 182 is connected to each of the fork lift hydraulic ram 152 and one or more trailer supporting hydraulic rams 186 as shown in FIG. 1B, and as shown and described below in greater detail. It is to be understood that the diverter valve 182 may include a solenoid and may be controlled from the control box 71, 173, or 177 similarly to the control of the pumps and valves associated with motors 142, 145. The toolbox 96 may also have a winch 188 supported therein, and a winch cable 191 may be extended through a wall of the toolbox 96 as shown in FIG. 2C. Among other things, the winch 188 can be used to pull a loaded pallet along a trailer bed by way of the cable 191, as shown and described with regard to FIG. 3B below.

The truck fork lift 15 in combination with the truck 18 may be used together with other devices shown in FIGS. 3A-5B to provide a more comprehensive lifting and hauling system. As such, the hauling system may include a trailer 200 with a goose neck tongue 203 for a connection with the hitch like that shown in FIGS. 1A and 1B. The system may also include a pallet buggy 206, which may be carried on the trailer 200 together with a load which may include pallets 209, for example. The trailer may include stowable ramps 212, 215, and 218, which can be slid into ramps carriers 221 for storage during periods of transport and non-use. It is to be understood that the ramps 212, 215, and 218 and the ramp holders 221 may be located at any position along the trailer. In particular, it is to be understood that the trailer will need to be loaded with a greater amount of the overall weight centered slightly forward from the center of the trailer. Thus, it is to be understood that the relative positions of the loaded pallets 209 and the pallet buggy 206 can be varied depending upon the particulars of the load to be carried. The trailer 200 may be any of a variety of trailers, but should have a rating greater than or equal to any maximum that will be hauled on the trailer for safety purposes.

Figure 3A:
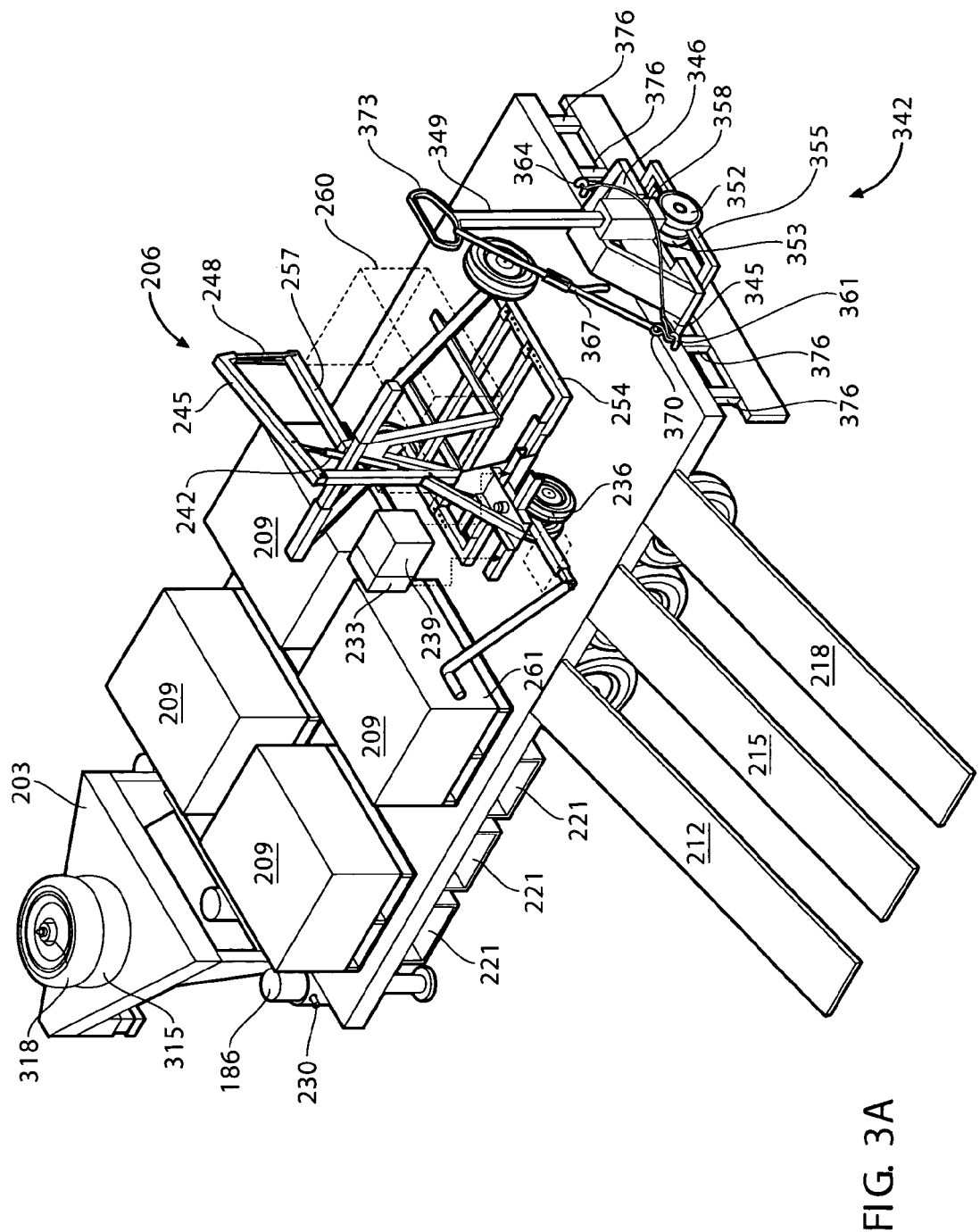
FIG. 3A is a diagrammatic perspective view of a trailer in accordance with the present invention.

As shown in FIG. 3A, one or more trailer supporting rams 186 may be provided at respective corners of the trailer. Alternatively, a trailer ram 186 could be provided generally centrally located along a front edge of the trailer bed as shown in FIGS. 3B and 3C. FIG. 3C is a diagrammatic end view of the trailer 200 taken generally in a direction of arrow 3C of FIG. 3B. The rams 186 may have a stowed position in which the rams are retracted upwardly and a position of use in which the rams are slid downwardly through a sleeve 227 and locked in a position of use by a pin 230 as shown in FIG. 3A, for example. The rams 186 could alternatively be mounted to rotate in and out of a position of use on a pivot 228 as shown in FIGS. 3B and 3C. Thus, when it is desired to remove a loaded trailer 200 from a truck, the trailer and load may be supported by the trailer rams 186 and moved to an unhitched condition by the rams 186. Actuation of the rams 186 may be provided by a hydraulic pump such as the mast pump 130. As indicated above, a diverter valve 182 may be provided to alternatively connect the pump 130 and solenoid valve 136 of the mast hydraulic ram 152 to the trailer hydraulic rams 186. The trailer hydraulic rams 186 may be simultaneously fed by a single line 148 that is divided severally into as many lines as there are trailer rams 186. It is to be understood that additional trailer rams 186 could be provided at rear corners or elsewhere on the trailer for increased stability and/or versatility.

As shown in FIGS. 3B-3C, manually slidable telescoping stands 231 may include pins 230 for manually adjusting an extent of the stands 231 in a downward direction to engage the ground in a position of rest after the trailer ram(s) 186 have been used to raise the trailer. Once the stands 231 have been extended, the trailer ram(s) 186 may be released. Thus, the trailer may be provided with a great degree of stability while loading and unloading. As shown in FIG. 3B, the winch cable 191 may be routed from the winch to a loaded pallet 209 and engaged around a base of the pallet 209 for the purpose of moving the pallet along a bed of the trailer 200. Thus, the pallet 209 may be repositioned or oriented for engagement with the forks of the truck fork lift 15. In order to protect the fork lift ram 152, the winch cable 191 may be threaded through a guide 232 that holds the winch cable 191 out of engagement with the fork lift ram 152 while pulling the pallet 209, for example. The winch cable guide 232 may be supported on a lower edge of the fork lift plate 84 as shown in FIG. 3D, which is a view of the fork lift mast taken generally in a direction of arrow 3D of FIG. 3B.

As shown in FIGS. 3B and 3D, the truck fork lift 15 may include a take up reel 303 that may be mounted on an underside of a rear portion of the truck frame or bed 27. This take up reel may be biased to draw in a line 306 that has one or more video cables and power to the one or more respective cameras 92, 94, 95, 97 shown in FIG. 1A. Thus, the video and power cables may be fed into an inner end of the line 306 on the take up reel 303. As the mast is raised or lowered, an outer end of the line 306 may be withdrawn from the reel 303 to provide the needed slack as the camera is moved together with the mast 21, fork 24, or fork plate 84. The line 306 may extend over a pulley 309 that may be rotatably mounted on a shaft 312 that also supports one or more chain pulley for lifting the fork plate 84. Likewise, as the fork plate is moved in a direction requiring a shorter length of the line 306, the take up reel 303 will automatically retract and wind a portion of the line 306 on the take up reel 303. In this way, the take up reel 303 reduces the chances of a loose line that may become tangled or drag on the ground during use of the truck fork lift 15. At the same time, continuous viewing of images may be provided as the forks are adjusted to greater or lesser heights, without the need of keeping track of the lines to the camera.

When the take up reel 303 is mounted under a rear portion of the truck bed 27, the customary location for the truck spare tire will be occupied by the take up reel 303 and the housing that supports the take up reel 303. As shown in FIGS. 3A, 3B, and 3C, one or more spare tires 315, 318 may be supported on the trailer goose neck 203. For this purpose, a post 321 may be supported on and extend upwardly from the goose neck 203. Thus, spare trailer and/or truck tires 315, 318 may be conveniently supported for easy retrieval, as needed.

FIG. 3A also shows a manual pallet dolly 342 that may be supported on a rear of the trailer 200. The pallet dolly 342 has a pair of forks 345, 346 configured to engage in a pallet. The pallet dolly also has a jacking handle 349 that jacks up a load placed on the forks and also steers the dolly during use. A pair of closely spaced wheels 352, 353 are connected to the jacking handle. This pallet dolly is known, but is not typically supported on a trailer in the manner shown in FIG. 3A. There are three primary securing mechanisms that safely hold the pallet dolly on the trailer 200. Firstly, a stopping cross bar 355 is mounted on a bumper 356 in a downwardly and rearwardly extending position. As shown, the closely spaced wheels 352, 353 straddle the stopping cross bar 355 and engage the stopping cross bar generally at an axle between the wheels 352, 353 under the force of gravity. This mechanism will inhibit separation of the pallet dolly from the trailer 200 under most circumstances during pulling of the trailer 200 by a truck. Secondly, the pallet dolly 342 is secured by a blocking cable 358 permanently connected to a first ring 361 mounted on the trailer bed frame and removably connected to a second ring 364 mounted to the trailer bed frame. The connections may be formed by cable clamps and openable links, for example. As shown, the cable forms a support strap that engages the pallet dolly on a rear side thereof and extends forwardly and laterally outward to the rings 361, 364 when the blocking cable 358 is in a connected state. As such, even if the closely spaced wheels 352, 353 were to clear the stopping cross bar 355 during a bumpy ride, for example, the blocking cable would prevent rearward movement of the pallet dolly away from a rear end of the trailer 200. Thirdly, a tightenable strap 367 having a hook 370 connected thereon is looped through a closed ring 373 of the jacking handle 349. The hook may be engaged in the first ring 361, and the strap may be tightened to provide a securing tension that will hold the pallet dolly in place on the trailer. The bumper 356 is mounted on the trailer 200 by vertical spacers 376 that form spaces between an underside of the bed of the trailer and the bumper 356. These vertical spacers 376 may be located close to outer sides of the pallet dolly in order to inhibit sideway movement of the pallet dolly 342 when the trailer 200 is being pulled with the pallet dolly 342 supported thereon.

As shown in FIGS. 3A and 4A-4C, the pallet buggy 206 is powered by a motor 233 that drives a wheel 236. The motor also runs a hydraulic pump and reservoir system 239 that is connected to a buggy ram 242. The buggy ram 242, in turn, raises and lowers a buggy crane arm 245. A proximal end of the buggy crane arm 245 is pivotally connected to a vertical frame member 251 of the pallet buggy frame 254. The buggy crane arm 245 has a cable 248 connected to a distal end thereof. A lower end of the cable 248 is connected to a suspended fork 257, which engages and supports a load such as pallet 260, as shown in FIGS. 3A and 4A-4C. Thus, actuation of the pallet buggy ram 242 raises or lowers the crane arm 245 and the suspended pallet fork 257 to raise or lower the load 260, as desired.

The pallet buggy 206 advantageously provides a device that can be maneuvered into and out of tight spaces for picking up and moving loads. For example, if a load needs to be moved into a shelter or structure that has a low clearance opening, the pallet buggy 206 is well adapted for delivering a load into such a structure. The pallet buggy 206 is also an all-terrain vehicle that can maneuver over contours and soil hardness of great variation. The pallet buggy 206 may also be maneuvered and steered by a steering lever 261, for example, connected to the rear wheel(s) 236 in order to navigate turns. On the other hand, front wheels 263 are positioned to support the frame 254 of the pallet buggy. The motor 233 and the hydraulic system 239 may be mounted on a platform that is pivotally connected to the frame 254 by a vertically oriented pin, for example. Thus, the turning may be effected by pivoting a rear portion of the pallet buggy relative to a front end thereof.

Figure 4A:
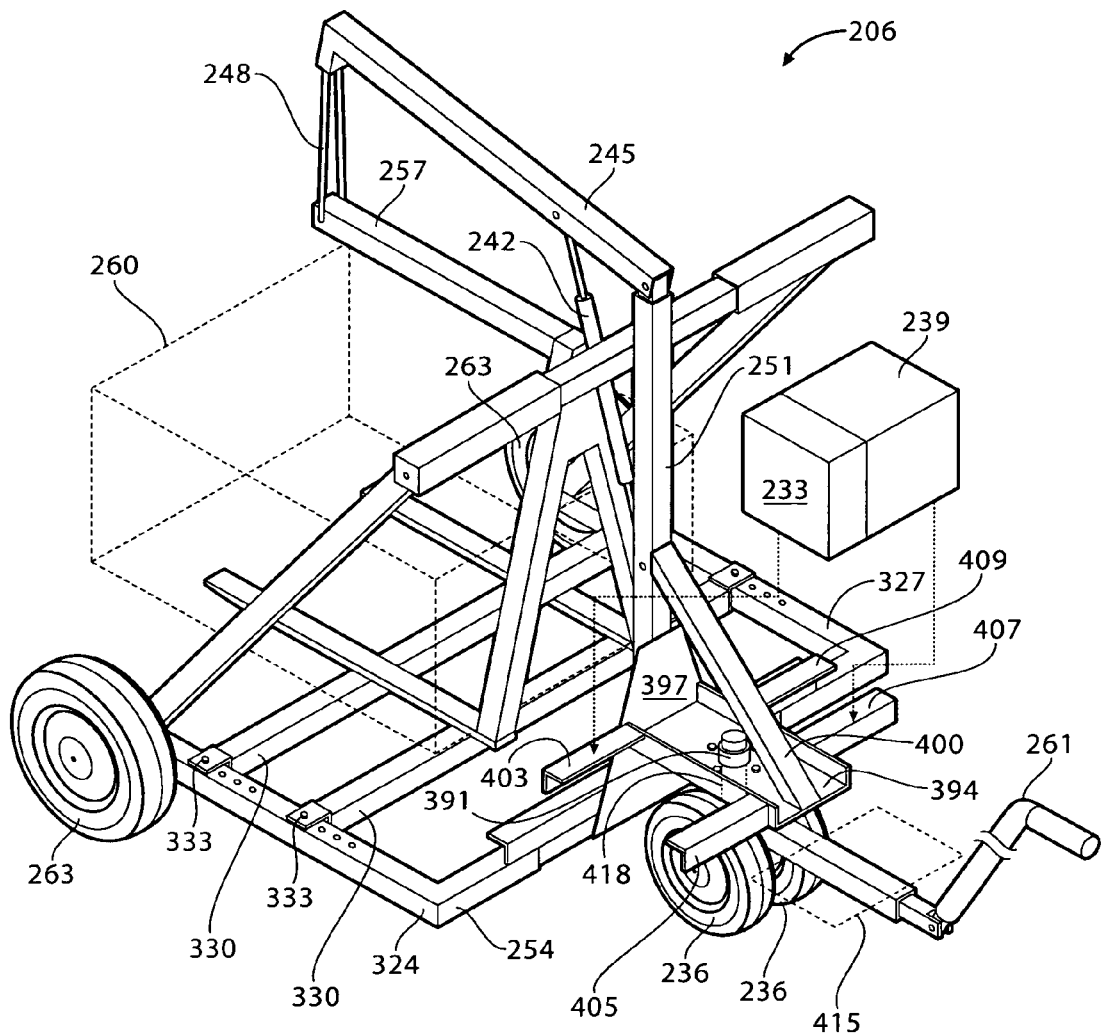
FIG. 4A is a more detailed diagrammatic perspective view of a pallet buggy in accordance with that shown in FIG. 3A.
Figure 4B:
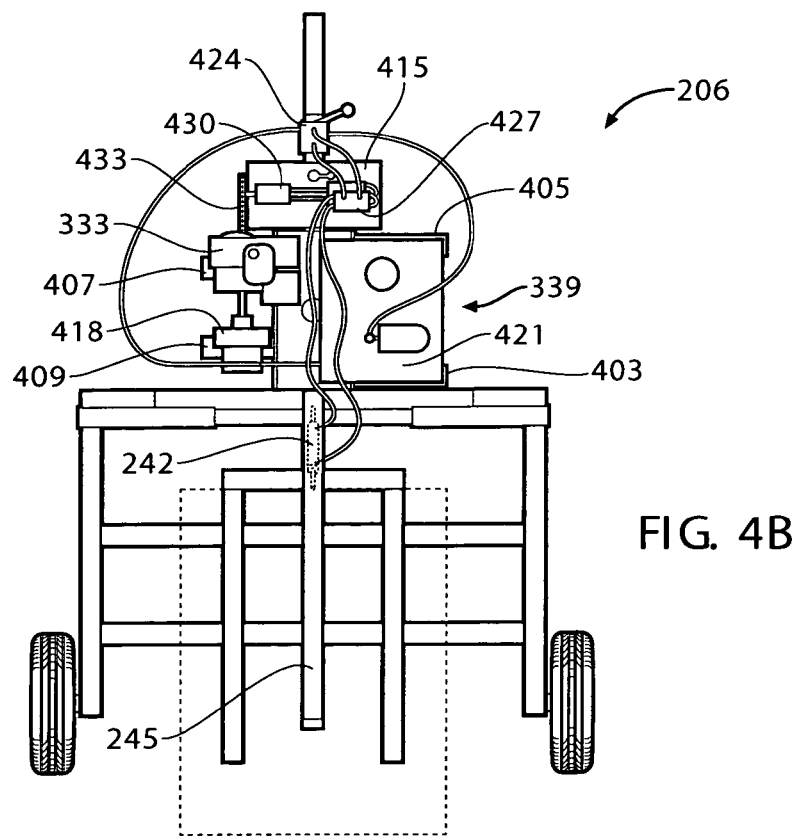
FIG. 4B is a top plan view of the pallet buggy of FIG. 4A.
Figure 4C:
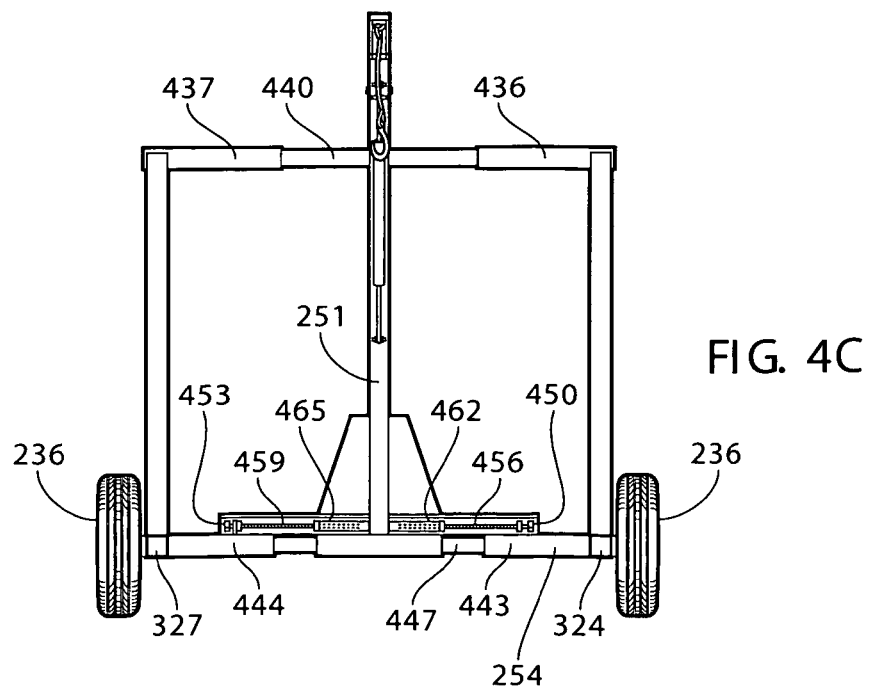
FIG. 4C is a front plan view of the pallet buggy of FIG. 4B taken in a direction of arrow 4C.

The frame 254 is configured to support loads of three times or more than a weight of the pallet buggy 206 itself. That is, the pallet buggy may weigh a 1,000 pounds or less while being able to support and transport loads of 3,000 pounds or greater. As shown in FIGS. 4A-4C, the pallet buggy frame 254 may have outer lateral frame arms 324, 327 that generally straddle a load 260 to be born. Then the load 260 may be raised, and load platform cross bars 330 may be placed below the load 260 and locked into place on the frame arms 324, 327 by pins 333, for example. Then the load 260 may be lowered onto the load platform cross bars 330 for transport. The load platform cross bars 330 may be formed of closed or open channel members with upside down L-sectioned end brackets stoppingly engaging an upper surface of the frame arms as shown in FIG. 3E.

As shown in FIG. 4A, steering of the pallet buggy may be achieved by a articulating the rear wheels 236 relative to the frame 254. A steering pivot assembly 391 may be mounted to an underside of a channel member 394. A steering shaft 395 may extend downwardly and be pivotable with the wheels 236 about a vertical axis, while a hub of the pivot assembly may protrude upwardly through the channel member 394. The steering pivot shaft 395 of the steering pivot assembly may thus pivot on a generally vertical axis. The channel member 394 may be mounted to the frame 254 by a gusset member 397 and an angled member 400 for increased strength. Motor and hydraulic support members 403, 405, 407, and 409 may be fixed to the channel member 394. These members 403, 405, 407, and 409 may receive and support the motor 333, and the hydraulic pump and reservoir 339, as shown. A hydraulic motor and valve platform 412 may be slidably supported on a steering bar 415 rigidly connected to the steering shaft 395. The steering lever 261 may be connected to an outer end of the steering bar 415.

FIG. 4B shows a top plan view of the pallet buggy 206 with the motor 333 and the hydraulic pump and reservoir supported on the support members 403, 405, 407, and 409. The motor 333 drives a hydraulic pump 418, which draws hydraulic fluid from a reservoir 421 and moves it through a closed loop. A lever control valve 424 controls whether the hydraulic fluid is routed directly back through the reservoir 421, when in a neutral position, or in one of first and second directions through a diverter valve 427. When the lever control valve 424 is pulled all the way back, the fluid may be forced in a direction to raise a load or drive the wheels 236 in a rearward direction. When the lever control valve 424 is pushed all the way forward, the fluid may be forced in a direction to lower the load or drive the wheels in a forward direction. The diverter valve 427 determines whether the fluid is routed to the pallet buggy ram 242 or to the a hydraulic motor 430. Thus, the diverter valve also provides a safety mechanism. That is, the pallet buggy 206 in this configuration cannot lift by the pallet buggy ram 242 and drive the pallet buggy wheels 236 at the same time. When the diverter valve routes the fluid toward the hydraulic motor 430, the hydraulic motor 430 may drive the wheels 236 by a chain 433, for example. The direction of the driving force is adjusted by the user as he engages the lever control valve 424. Similarly, the user may selectively raise or lower the crane arm 245 with the same lever control valve when the diverter valve has been adjusted to route the fluid through the ram 242.

FIG. 4C is a front plan view taken along a direction of arrow 4C of FIG. 4B. As shown, the frame 254 may be a laterally expandable frame in which a spacing of the lateral frame arms 324, 327 may be adjusted to match a load width as needed. Upper cross bar sleeves 436, 437 may slidably engage an upper cross bar 440. Similarly, lower cross bar sleeves 443, 444, may slidably engage a lower cross bar 447. To adjust the width of the pallet buggy, forces may be removed from the frame by hoisting the buggy 206 nearly or completely out of engagement with a ground surface. Then the user may engage power heads 450 and 453 with a power wrench or other turning device, and turn threaded shafts 456 and 459 in or out of threaded sleeves 462 and 465, respectively. At a most retracted position, the threaded shafts may engage a stop, which may be provided by an outer wall of the vertical frame member 251. In this position, the pallet buggy may be narrow enough to fit in a standard width bed of a pick up truck for easy hauling the pallet buggy.

FIG. 5A is a side plan view and 5B is a top plan view of a stanchion 266 for supporting and storing the truck fork lift 15 when it is not mounted to the truck 18. The stanchion 266 may include two elongate skids 269, 270 in the form of channel members. A plurality of vertically extending frame members 272 and 275 may be fixed to the skids 269, 270 and extend upwardly therefrom. Diagonal strengthening members 278 may also extend in a vertical direction as well as a horizontal direction diagonally up from the skids 269 to a horizontal frame member 281. The skids 269, 270, and the combination of vertical, horizontal, and diagonal frame members 272, 275, 278, and 281 may support fork receivers 284. The fork receivers 284 may be rectangular tubular channels with open ends to receive the forks 24 of the truck fork lift 15.

Figure 5B:
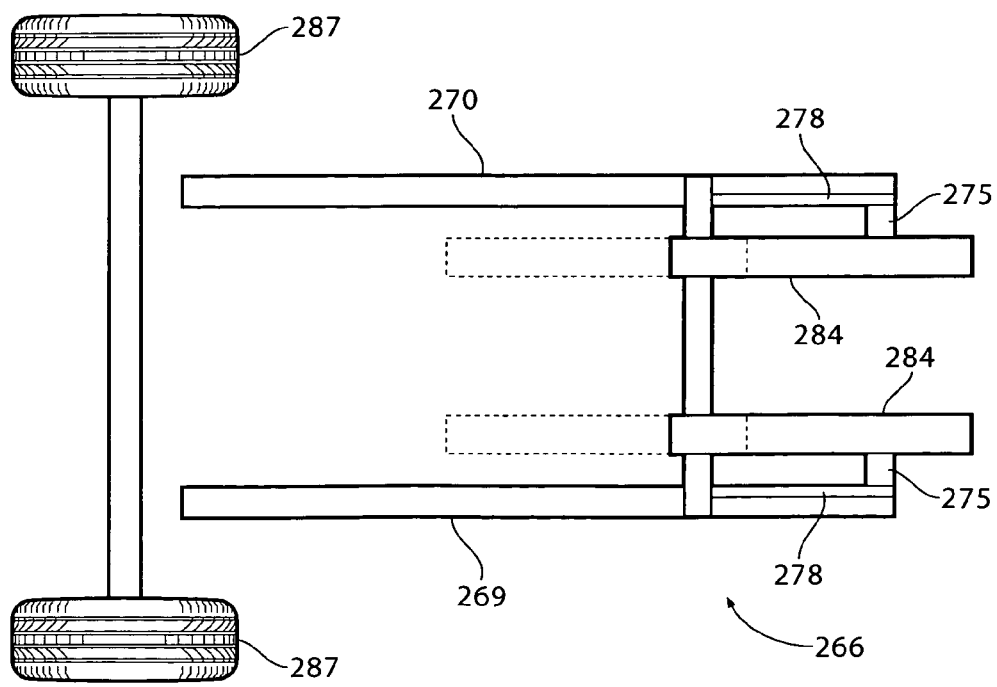
FIG. 5B is a diagrammatic top plan view of the fork lift stanchion of FIG. 5A.

Thus, a truck 18 may be backed up so that the forks 24 are stabbed into the receivers 284. Then the truck fork lift may be operated to transfer the load of the fork lift 15 to the stanchion. Before the load is transferred in this manner, the bolts 69 that secure the beams 30, 33, and/or flat stock material may be removed from the truck frame 336 by disengaging a nut 339 that may be welded or otherwise secured to the truck frame 336, as shown in FIG. 5A. Any hydraulic lines may be disconnected from the hydraulic pumps, and any electrical and video cables may be disconnected. The hydraulic lines to the truck fork lift 15 may be disconnected by a quick disconnect, for example. All loosening of the bolts and disconnections of the lines may be easily made within approximately three minutes. And it may take only ten minutes to completely remove the fork lift including the mast and mounting beams together with the hydraulic rams and the components mounted to these members. The hydraulic pumps, controls, and monitor may remain connected to the truck. In separating the truck fork lift from the truck, the beams 30 and 33 may be slid out of the channels 124 in the toolbox 96, when the channels 124 form part of the mounting of the truck fork lift 15. As shown in FIGS. 5A and 5B, the skids 269, 270 may be set at a width narrower than the rear wheels 287 of the truck 18 so that the truck may generally straddle the skids 269, 270 during transfer of the truck fork lift 15 from the truck bed onto the stanchion 266. As shown by dashed lines in FIGS. 5A and 5B, the fork receivers 284 may be positioned fore or aft on the frame members of the stanchion 266, depending upon the desired load distribution.

It is to be understood that the hydraulic pumps are connected to the actuators through valves for the various embodiments and aspects of the present invention. The controls may include electric over hydraulic, manual levers, or a combination of electric and manual controls and electric controls so that if the electric controls were to fail, then the manual levers would provided needed redundancy.

It is also to be understood that while the reservoirs and pumps generally described above and in reference to the drawings may be taken to be pumps dedicated to one or more particular hydraulic circuit, the pumps described could also represent or be replaced by other pumps. For example, an auger attached to the fork lift may need a pump of much greater capacity than that required for lifting and lowering the forks. Thus, the pump or pumps may comprise two or more pumps, or may be provided by one or more pumps connected to a transmission of the truck. Furthermore, a larger capacity pump or set of pumps may be connected to actuators by a set or station of valves. These valves may have electric and/or manual controls.

Exemplary Methods for Delivery Service

The electric over hydraulic solenoid valves create a flexibility to remotely operate the forks from the cab or from outside the truck. Sometimes this option is needed because of a particular terrain in which stabbing a pallet is facilitated by viewing the action from a particular vantage point. Thus, loading or unloading pallets on uneven terrain can be facilitated by utilizing a cable remote control or wireless remote control system.

Truck Forklift, Pallet Buggy, and Trailer Operation

Four pallets may be loaded on the trailer at a warehouse and transported to a delivery site. The driver/user of a truck may pull in front of a driveway. The pallet buggy may be unloaded and placed in a garage in which the pallets are to be placed. (An ideal parked unload position in a residential subdivision is in a cul-de-sac with trailer centered for easy access to both sides of the trailer. Otherwise, the pallets may need to be pulled to an accessible side of the trailer by a winch and winch cable similar to that described above.) The driver/user may leave the truck running and turn a power switch of the system "on" to enable operation. Then the user may disconnect safety chains and any electrical connection between the truck and trailer. The user may deploy a drop jack "hydraulic cylinder" or ram on the trailer and make a hitch of the truck and trailer ready for release so that the trailer tongue may be raised. It is important to remember that the trailer may be loaded with up to 12,000 pounds of product.

The driver may use a quick disconnect hydraulic hose extending from the trailer hydraulic cylinder or ram to an auxiliary hydraulic output to raise and lower the trailer. The driver may raise the trailer and then disconnect the auxiliary hydraulic hose. Then the user may move the truck forward and unfold each fork from a transport position to a working position and remove securing straps from a palletized product on the trailer.

The user may back the truck up to either side of the trailer, centering on the rear pallet first. By viewing a camera monitor within the cab, the user may position the forks to stab the pallet. The user may slowly back up to the pallet while viewing a screen of the monitor. Once, a pallet has been stabbed and raised at least slightly with the forks, the user may drive slowly to a position about five feet away from trailer. Then he/she may lower the pallet to a height of approximately two feet from the ground. With the load in this position, the driver may then drive approximately five miles per hour or slower into the garage and place the pallet inside.

By always viewing the monitor as he/she is placing the loaded pallet on the garage floor, a user may avoid striking the house or garage. Likewise, the hydraulic pressure enables the user to selectively control a height of the truck fork lift including the mast. The mast may be configured to not exceed approximately seventy-nine inches in height when the truck is unloaded so as not to hit the garage door when the truck is pulled in and out of the garage. Other mast heights may be smaller or larger than seventy-nine inches.

Depending on a terrain of the ground over which the load is to be transported by the truck fork lift, a strap may be used to wrap around the palletized load and the forklift mast to stabilized the load. In this case, the strap would need to be removed before leaving the garage. Then the user may return to the trailer in the truck and repeat the above described procedure. This method of operation may reduce the unloading time approximately fifteen to twenty minutes per delivery as compared to a method that uses a crane. More importantly, the user or operator may remain in the cab when moving and unloading the pallet from the forks.

In some cases, the palletized loads may need to be placed in a garage having a vertical clearance lower than the minimum height of the truck fork lift mast, or the loads may need to be maneuvered in a manner that is difficult to achieve with the truck fork lift. In these cases, the palletized load may be set on the ground at any convenient location, and the pallet buggy may be used to engage, lift, place the load on a support frame of the pallet buggy, and transport the load to a location for final placement of the delivery. As such, the pallet buggy may be used to move the pallet into the garage when a passage is too narrow for the truck fork lift, for example. In a case where there is no paved driveway, the truck may be backed up to a sheet of plywood that has been previously placed on a pair of flat pallets, for example. The palletized load may be placed on the sheet of plywood by the truck fork lift. Then the palletized load may be moved with the pallet buggy into the location of final placement of the delivery within the garage.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims. For example, other types of actuators may be implemented in place of the hydraulic actuators described above. These actuators may include electric actuators, pneumatic actuators, magnetic actuators, and/or mechanical actuators without departing from the spirit and scope of the invention. The electric actuators may include a lead screw and nut combination driven by a motor, for example.

What is claimed is:

1. A vehicle having a truck bed carried by a truck frame, the vehicle comprising:
    a mounting beam:
    a detachable attachment mechanism which couples the mounting beam to the truck frame, wherein the detachable attachment mechanism extends through the truck bed;
    a mast attachment plate;
    an adjustment bracket assembly having a bracket attachment plate, the adjustment attachment plate being coupled to the mast attachment plate;
    a pivot connection piece coupled to the mounting bean and bracket attachment plate; and
    a hydraulic ram connection piece coupled to the bracket attachment plate.

2. The vehicle of claim 1, wherein the adjustment bracket assembly includes first and second mounting holes extending therethrough, wherein the second mounting hole is above the first mounting hole.

3. The vehicle of claim 2, wherein the adjustment bracket assembly includes third and fourth mounting holes extending therethrough, wherein the fourth mounting hole is above the second mounting hole, and the third mounting hole is between the first and second mounting holes.

4. The vehicle of claim 3, further including a mast which is coupled to the adjustment bracket assembly through fasteners which extend through the first and third mounting holes.

5. The vehicle of claim 4, wherein the pivot connection piece and hydraulic ram connection piece are coupled to the adjustment bracket assembly proximate to the second and fourth mounting holes.

6. The vehicle of claim 3, further including a mast Which is coupled to the adjustment bracket assembly through fasteners which extend through the second and fourth mounting holes.

7. The vehicle of claim 3, wherein the pivot connection piece and hydraulic ram connection piece are coupled to the adjustment bracket assembly proximate to the first and third mounting holes.

8. The vehicle of claim 7, further including a hydraulic ram connected between the mounting beam and hydraulic ram connection piece.

9. The vehicle of claim 1, wherein the adjustment bracket assembly is adjustable to adjust the position of the mast attachment plate relative to the mounting beam.

10. The vehicle of claim 1, wherein the bracket attachment plate includes a plurality of openings spaced apart from each other.

11. The vehicle of claim 1, further including a mast coupled to the mast attachment plate.

12. The vehicle of claim 11, wherein the mast is coupled to the adjustment bracket assembly.

13. The vehicle of claim 12, wherein the adjustment bracket assembly holds the mast at a predetermined position relative to the mounting beam.

14. The vehicle of claim 11, wherein the adjustment bracket assembly is adjustable to adjust the position of the mast relative to the mounting beam.

15. The vehicle of claim 1, wherein the hydraulic ram connection piece positioned above the pivot connection piece.

16. The vehicle of claim 15, further including a hydraulic ram coupled between the mounting beam and hydraulic ram connection piece.

17. The vehicle of claim 16, wherein the mast attachment plate rotates in response to actuating the hydraulic ram.

18. The vehicle of claim 1, wherein the adjustment bracket assembly is positioned proximate to a rear of the vehicle.

* * * * *